United States Patent
Kazama et al.

(10) Patent No.: US 10,970,430 B2
(45) Date of Patent: Apr. 6, 2021

(54) COMPUTER-READABLE RECORDING MEDIUM, COMPUTING MACHINE RESOURCE ALLOCATION METHOD, AND PARTICLE SIMULATION APPARATUS

(71) Applicant: FUJITSU LIMITED, Kawasaki (JP)

(72) Inventors: Masaki Kazama, Kawasaki (JP); Tamon Suwa, Kawasaki (JP); Keita Ogasawara, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 988 days.

(21) Appl. No.: 15/264,918

(22) Filed: Sep. 14, 2016

(65) Prior Publication Data

US 2017/0091353 A1 Mar. 30, 2017

(30) Foreign Application Priority Data

Sep. 25, 2015 (JP) .............................. JP2015-187666

(51) Int. Cl.
*G06F 30/20* (2020.01)
*G06F 9/50* (2006.01)
*G06F 111/10* (2020.01)

(52) U.S. Cl.
CPC ............ *G06F 30/20* (2020.01); *G06F 9/5061* (2013.01); *G06F 9/5066* (2013.01); *G06F 2111/10* (2020.01)

(58) Field of Classification Search
CPC ........................... G06F 17/5009; G06F 9/5061
See application file for complete search history.

(56) References Cited

U.S. PATENT DOCUMENTS 9,881,110 B1* 1/2018 Mohajerin .......... G06F 17/5009
2007/0250296 A1* 10/2007 Shima ..................... G01W 1/10
703/2

(Continued)

FOREIGN PATENT DOCUMENTS

JP  2-280266   11/1990
JP  4-363752   12/1992

(Continued)

OTHER PUBLICATIONS

Nakashima, Hiroshi, Yohei Miyake, Hideyuki Usui, and Yoshiharu Omura. "OhHelp: a scalable domain-decomposing dynamic load balancing for particle-in-cell simulations." In Proceedings of the 23rd international conference on Supercomputing, pp. 90-99. ACM, 2009. (Year: 2009).*

(Continued)

*Primary Examiner* — Chuen-Meei Gan
(74) *Attorney, Agent, or Firm* — Fujitsu Patent Center

(57) ABSTRACT

When simulating behavior of particles in a space having regions and subject to analysis, by processes of a predetermined number fewer than the number of regions, a particle simulation apparatus assigns the regions of the predetermined number, which are selected in descending order of the number of particles included in each of the regions, to differing processes among the processes of the predetermined number. The particle simulation apparatus sequentially assigns unassigned regions in descending order of the number of particles included in each of the unassigned regions, to the process for which the number of particles included in the regions already assigned to each of the processes of the predetermined number is the smallest.

8 Claims, 20 Drawing Sheets

(56) References Cited

U.S. PATENT DOCUMENTS

| | | | | |
|---|---|---|---|---|
| 2008/0189093 | A1* | 8/2008 | Fitch | G16B 15/00 703/11 |
| 2008/0234990 | A1* | 9/2008 | Bowers | G06F 17/50 703/1 |
| 2012/0131592 | A1* | 5/2012 | Kim | G06F 9/5027 718/104 |
| 2014/0204095 | A1* | 7/2014 | Suwa | G06F 17/5009 345/441 |
| 2014/0365185 | A1* | 12/2014 | Kazama | G06F 17/5009 703/2 |
| 2015/0094998 | A1* | 4/2015 | Ogasawara | G06F 17/5009 703/2 |
| 2015/0161305 | A1* | 6/2015 | Kazama | G06F 17/5009 703/9 |
| 2015/0254379 | A1* | 9/2015 | Kazama | G06F 17/5009 703/2 |
| 2016/0196373 | A1* | 7/2016 | Suwa | G06F 17/5009 703/2 |
| 2017/0011147 | A1* | 1/2017 | Kazama | G06F 17/5009 |
| 2017/0132048 | A1* | 5/2017 | Suwa | G06F 17/5009 |

FOREIGN PATENT DOCUMENTS

| | | |
|---|---|---|
| JP | 9-160884 | 6/1997 |
| JP | 2015-138520 A | 7/2015 |

OTHER PUBLICATIONS

Murotani et al. "Developnnent of hierarchical domain decomposition explicit MPS method and application to large-scale tsunami analysis with floating objects." Journal of Advanced Simulation in Science and Engineering 1, No. 1 (2014): 16-35. (Year: 2014).*

Miyake, Yohei, and Hiroshi Nakashima. "Low-cost load balancing for parallel particle-in-cell simulations with thick overlapping layers." In 2013 12th IEEE International Conference on Trust, Security and Privacy in Computing and Communications, pp. 1107-1114. IEEE, 2013. (Year: 2013).*

Qiang, Ji, Robert D. Ryne, Salman Habib, and Viktor Decyk. "An object-oriented parallel particle-in-cell code for beam dynamics simulation in linear accelerators." Journal of Computational Physics 163, No. 2 (2000): 434-451. (Year: 2000).*

Kohei Murotani et al., "Tsunami Inundated Analysis for Turbine Building of Fukushima Daiichi Nuclear Power Station Unit 1 Using MPS Method", Proceedings of the Conference on Computational Engineering and Science, vol. 20 (Jun. 2015), 6 pages.

Kohei Murotani et al., "Distributed Memory Parallel Algorithm for Explicit MPS using ParMETIS", Transactions of JSCES, Paper No. 20120012 (Feb. 2012), 13 pages.

Satori Tsuzuki et al., "A Large-scale Particle-Based Simulation for Fluid-Structure Interaction using Dynamic Load Balance on a GPU Supercomputer", Proceedings of the Conference on Computational Engineering and Science vol. 20 (Jun. 2015), 5 pages.

Volker Springel, "The cosmological simulation code Gadget-2", Volker Springel, Monthly Notices of the Royal Astronomical Society, 364, pp. 1105-1134 (2005), 30 pages.

Japanese Office Action dated Mar. 12, 2019 for corresponding Japanese Patent Application No. 2015-187666, with English Translation, 6 pages. *Please note NPL "Kohei Murotani et al., Distributed Memory Parallel Algorithm for Explicit MPS using ParMETIS . . . " cited herewith, was previously cited in an IDS filed on Sep. 14, 2016.*

* cited by examiner

○ : PARTICLE

FIG.9

| PARTICLE NUMBER | POSITION INFORMATION | | | |
|---|---|---|---|---|
| | X | Y | Z | |
| p1 | x1 | y1 | z1 | ~ 901-1 |
| p2 | x2 | y2 | z2 | ~ 901-2 |
| ... | ... | ... | ... | |
| pn | xn | yn | zn | ~ 901-n |

| NUMBER OF BORDER LINES ALONG X-AXIS DIRECTION | xm | | | |
|---|---|---|---|---|
| X-COORDINATE VALUE OF BORDER LINE | Xb[1] | Xb[2] | ... | Xb[xm] |
| NUMBER OF BORDER LINES ALONG Y-AXIS DIRECTION | ym | | | |
| Y-COORDINATE VALUE OF BORDER LINE | Yb[1] | Yb[2] | ... | Yb[ym] |
| NUMBER OF BORDER LINES ALONG Z-AXIS DIRECTION | zm | | | |
| Z-COORDINATE VALUE OF BORDER LINE | Zb[1] | Zb[2] | ... | Zb[zm] |

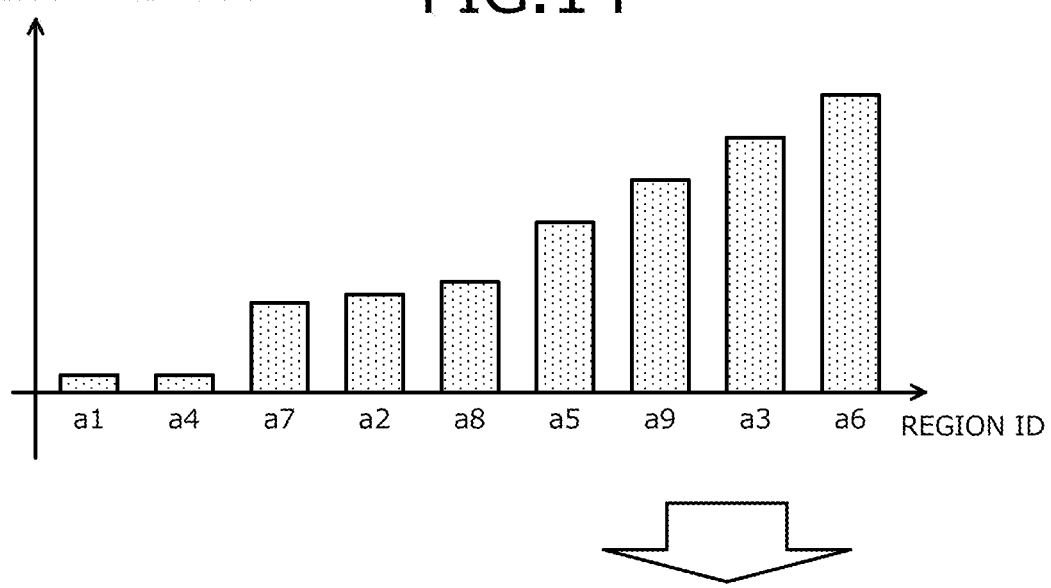
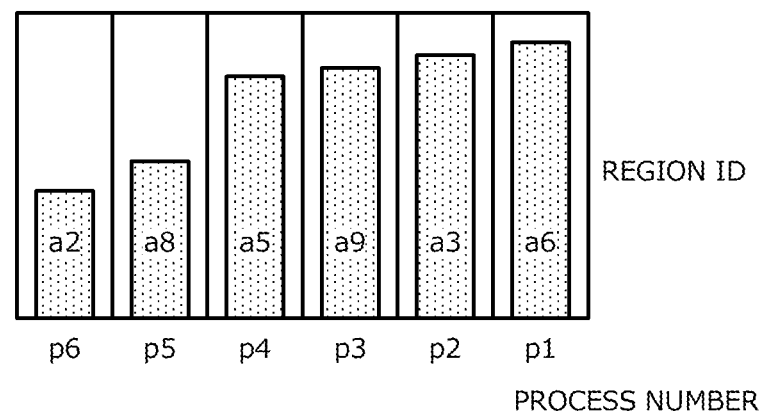
FIG.14

COMPUTER-READABLE RECORDING MEDIUM, COMPUTING MACHINE RESOURCE ALLOCATION METHOD, AND PARTICLE SIMULATION APPARATUS

CROSS REFERENCE TO RELATED APPLICATIONS

This application is based upon and claims the benefit of priority of the prior Japanese Patent Application No. 2015-187666, filed on Sep. 25, 2015, the entire contents of which are incorporated herein by reference.

FIELD

The embodiments discussed herein are related to a computer-readable recording medium, a computing machine resource allocation method, and particle simulation apparatus.

BACKGROUND

Simulation using a particle method has recently been used to execute fluid analysis to study flows of water and air, elastic body analysis to study the behavior of compressed rubber, and the like.

As to the simulation using the particle method, according to a conventional technique, a space to be analyzed is divided into plural regions, each of the divided plural regions is assigned to any of plural processes, and calculation of the behavior of particles is executed in parallel by the plural processes. For example, according to conventional technique, a region is divided such that calculation loads for the behavior of the particles are equalized by dividing the region such that the number of particles included in each of regions is equalized (see, for example, Murotani, Kohei; Koshizuka, Seiichi; Shioya, Ryuji; Ogino, Masao; Nagai, Eiichi; Fujisawa, Toshimitsu, and Anju, Akira, "Tsunami Inundated Analysis for Turbine Building of Fukushima Daiichi Nuclear Power Station Unit 1 Using MPS Method", Proceedings of the Conference on Computational Engineering and Science Vol. 20 (June 2015); Murotani, Kohei; Oochi, Masatoshi; Fujisawa, Toshimitsu; Koshizuka, Seiichi; Yoshimura, Shinobu, "Distributed Memory Parallel Algorithm for Explicit MPS using ParMETIS", Transactions of JSCES, Paper No. 20120012; and Tsuzuki, Satori and Aoki, Takayuki, "A Large-scale Particle-Based Simulation for Fluid-Structure Interaction using Dynamic Load Balance on a GPU Supercomputer", Proceedings of the Conference on Computational Engineering and Science Vol. 20 (June 2015)); and The cosmological simulation code GADGET-2", Volker Springel, Monthly Notices of the Royal Astronomical Society, 364, pp.1105-1134 (2005).

SUMMARY

According to an aspect of an embodiment, a non-transitory, computer-readable recording medium storing therein a particle simulation program causing a computer to execute a process including when the computer simulates behavior of particles in a space having regions and subject to analysis, by processes of a predetermined number fewer than the regions, assigning the regions of the predetermined number, selected in descending order of a number of particles included in each of the regions to differing processes among the processes of the predetermined number; and sequentially assigning unassigned regions in descending order of the number of particles included in each of the unassigned regions among the regions, excluding the regions of the predetermined number assigned to the differing processes, to a process identified based on the number of particles included in the region already assigned to each of the processes of the predetermined number.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 is an explanatory diagram of an example of particle data;

FIG. 10 is an explanatory diagram of an example of region data;

FIG. 14 is an explanatory diagram of an example where assignment is executed in descending order of evaluation values;

DESCRIPTION OF THE INVENTION

Embodiments of a computer-readable recording medium, a computing machine resource allocation method, and particle simulation apparatus according to the present invention will be described in detail with reference to the accompanying drawings.

Figure 1:
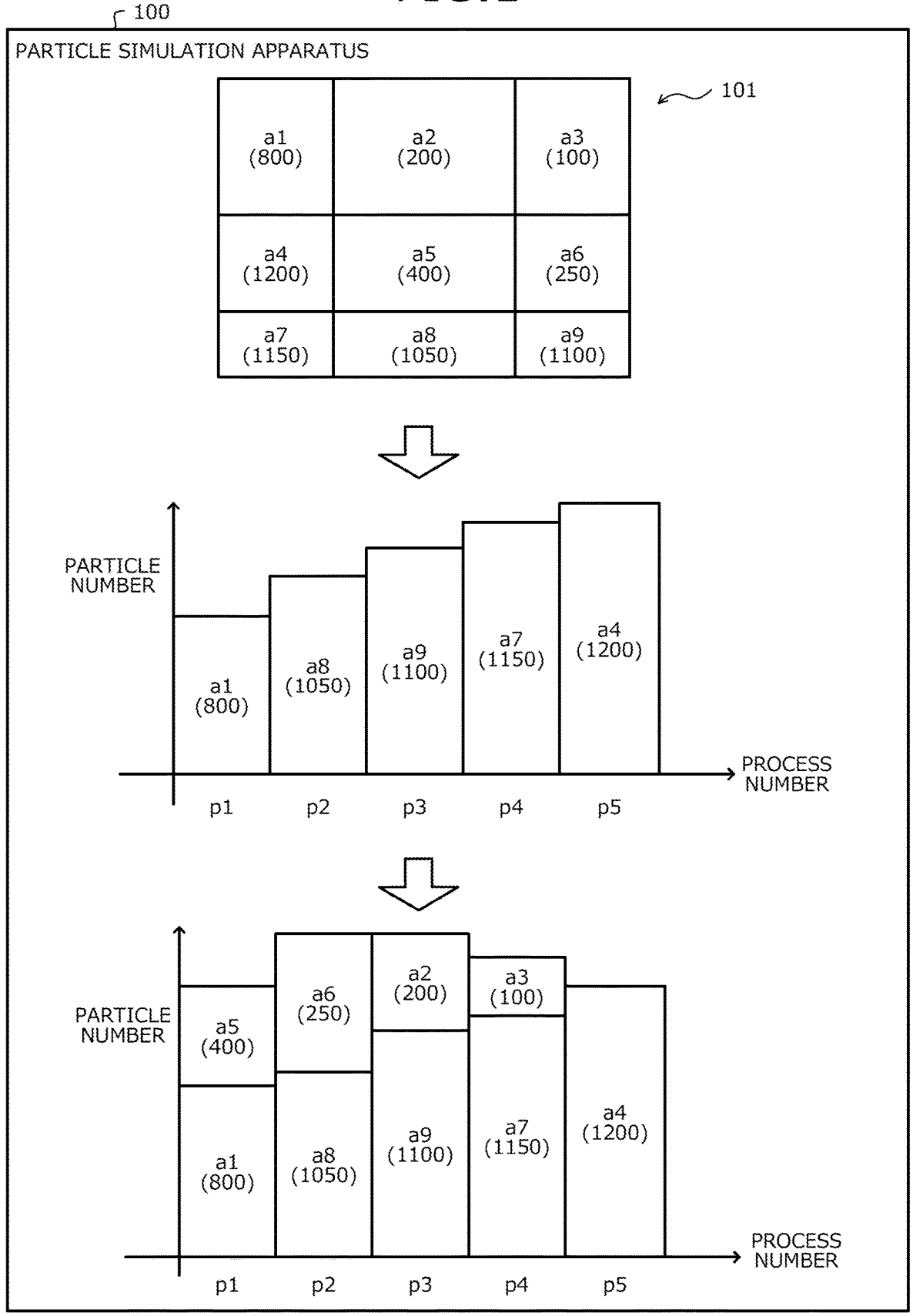
FIG. 1 is an explanatory diagram of one example of an operation executed by a particle simulation apparatus according to the present invention.

FIG. 1 is an explanatory diagram of one example of an operation executed by the particle simulation apparatus according to the present invention. The particle simulation apparatus 100 is a computer that determines, when parallel simulations are executed using a particle method, how the simulations are paralleled. The particle method is an approach of discretization to numerically solve an equation concerning a continuum. The object to be calculated is represented by an aggregate of particles in the particle method.

Figure 2:
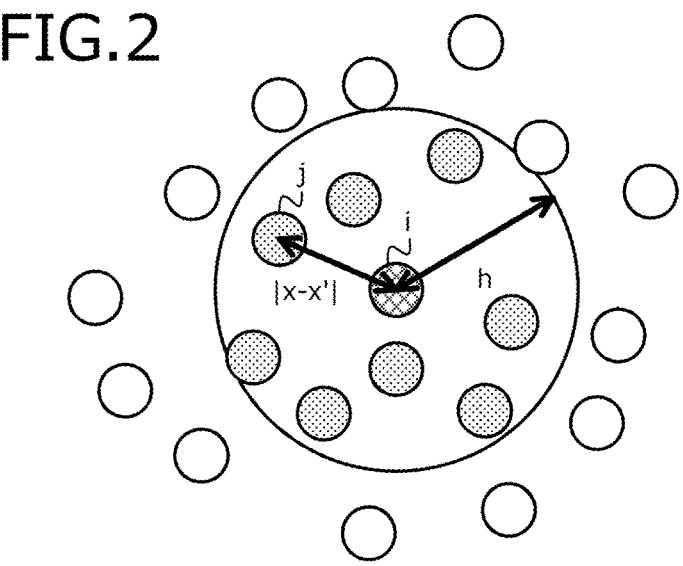
FIG. 2 is an explanatory diagram of an example of an influential region of a particle and neighbor particles of the particle.

Examples of simulation using the particle method include, for example, fluid analysis to study flows of water and air, and elastic body analysis to study the behavior of compressed rubber. For example, in a smoothed particles hydrodynamics (SPH) method or a moving particles semi-implicit (MPS) method, as depicted in FIG. 2 described later, the motion of particles is analyzed by calculating interactions to a particle from the particles present in the region set in advance. The SPH method and the MPS method are methods of describing a continuum using the distribution of particles in fluid analysis, elastic body analysis, or the like.

A region to be analyzed herein is a space disposed in a simulation space. The simulation space is a virtual three-dimensional space simulated on a computer. For example, the simulation space is a space virtually set in the particle simulation apparatus 100 by computer aided design (CAD) to simulate a space 101 to be analyzed. For example, a three-dimensional Cartesian coordinate system including an X-axis, a Y-axis, and a Z-axis is defined in the simulation space.

In the simulation using the particle method, a large number of particles are handled to satisfy a desired resolution of the object to be analyzed taking the space 101 to be analyzed to be wide. For example, to execute calculation of submergence by tsunami, several hundred million particles need to be used when an area of 5 [km] square is handled with a resolution of 1 [m].

In a simulation using the particle method, a conventional technique involves dividing the space 101 to be analyzed into plural regions, each of the divided plural regions being assigned to any one of plural processes, and calculation is thereby executed using the plural processes in parallel. The approach of executing calculation in parallel for the divided regions is also called "region dividing technique". Therefore, for example, according to a conventional technique a region is divided such that the calculation loads are equalized, by dividing the region to equalize the number of particles included in each of the regions.

However, with the traditional techniques, when the calculation loads are not equal to each other among the regions, the calculation loads of the processes are not equal to each other and the calculation time period increases. For example, when the shape of the positional distribution of the particles included in the space 101 to be analyzed is complicated, division such that the number of particles included in each of the regions is equal to each other is difficult and the calculation loads may not be equal among the regions.

In the present embodiment, the particle simulation apparatus 100 assigns the plural regions in descending order of the number of particles to the processes that differ from each other and are fewer in number than the number of regions and thereafter, assigns the unassigned regions in the same order sequentially to the processes based on the number of particles of the already assigned regions. Equalization of the loads in the parallel calculation may thereby be facilitated. Improvement of the efficiency of the parallel calculation may be facilitated.

For example, when the particle simulation apparatus 100 simulates the behavior of the particles in the space 101 to be analyzed that includes plural regions using a predetermined number of processes that are fewer in number than the number of the regions, the particle simulation apparatus 100 assigns the plural regions to the predetermined number of processes. The number of regions is represented by "nd" and the predetermined number is represented by "np". The predetermined number is also referred to as "the number of processes". In the present embodiment, the relation between nd and np is nd>np. In the example of FIG. 1, the number of the regions, nd, is nine counting from a region a1 to a region a9.

Each of the plural regions is a 3-dimensional space included in the space 101 to be analyzed. In the present embodiment, each of the plural regions is a cuboid. As described later with reference to FIGS. 2 and 4, one particle is influenced by the particles present in the neighbor thereof. The particles present in the neighbor of the one particle may be included in the regions adjacent to the region including the one particle. In a simulation using the particle method, therefore, when the behavior of the particles included in one region is simulated, a process of identifying the regions adjacent to the one region is executed. When the shape of the one region is simple like a cuboid, the identification of the regions adjacent thereto is easy and simplification can therefore be facilitated for the routines in the data communication among the regions. Reduction of the time period necessary for the parallel processing may be facilitated.

The "process" is an execution unit of a program and is a process to be executed by a calculation node. "Assigning a region to a process" refers to realizing a process step of calculating the particles included in a region using the process. When the apparatus to execute the simulation using the particle method is a computer exclusively designed for parallel processing, a calculation node is, for example, a core or a processor. When the apparatus to actually execute the particle simulation is a computer cluster, the calculation node is each of the computers included in the computer cluster. A "computer cluster" is a system that realizes parallel processing by connecting plural personal computers, plural servers, or super computers to each other.

Figure 23:
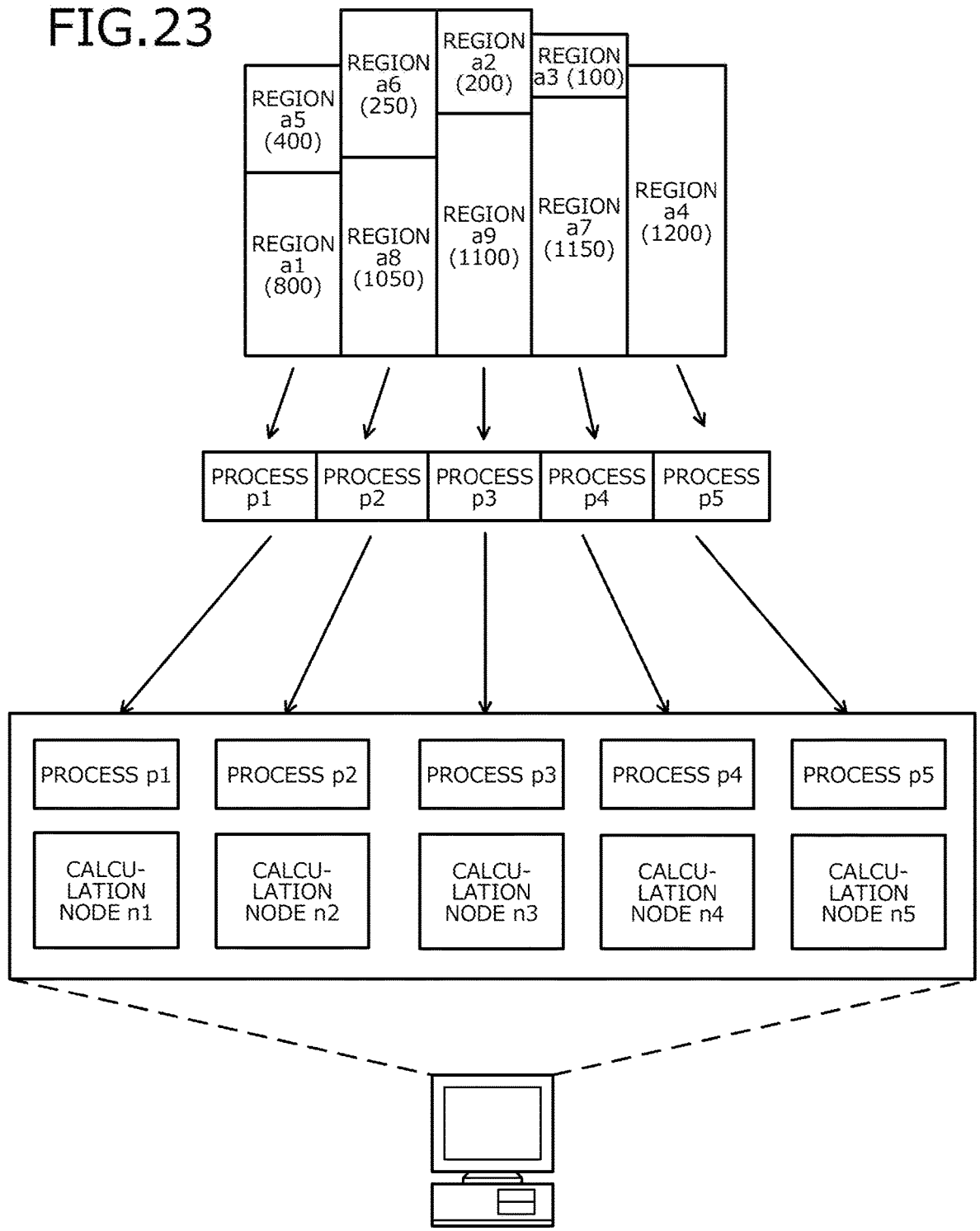
FIG. 23 is an explanatory diagram of a relationship between processes and calculation nodes.

It is assumed in the present embodiment that the capacity of each of the plural calculation nodes to execute predetermined number of processes is equal to each other. The predetermined number may be, for example, the number itself of the calculation nodes or be a multiple of the number of the calculation nodes. For example, when the number of the calculation nodes and the predetermined number are equal to each other, the calculation nodes and the predetermined number of processes are correlated with each other. For example, when two regions are assigned to a process p1, the process p1 is coded to calculate the behavior of the particles included in the two regions. The calculation node correlated with the process p1 executes the process p1 and the behavior of the particles included in the two regions is thereby simulated. An example is depicted in FIG. 23, where the number of the calculation nodes and the predetermined number are equal to each other. The particle simulation apparatus 100 assigns the regions in the present embodiment such that the number of the particles is equal for each of the predetermined number of processes while the particle simulation apparatus 100 may assign the regions such that the number of particles is equal for each of the predetermined number of calculation nodes.

The particle simulation apparatus 100 first assigns to the predetermined number of processes that differ from each other, a predetermined number of regions selected from the plural regions in descending order of the number of particles included in each of the plural regions. In FIG. 1, the number of particles included in the region is described in H. The descending order of the number of particles in FIG. 1 is the order that is the region a4, the region a7, the region a9, the region a8, the region a1, the region a5, the region a6, the region a2, and the region a3. The regions selected in the order of descending number of particles are, for example, the region a4, the region a7, the region a9, the region a8, and the region a1.

For example, the particle simulation apparatus 100 assigns the region a4 including the largest number of particles to a process p5. For example, the particle simulation apparatus 100 assigns the region a7 to a process p4. For example, the particle simulation apparatus 100 assigns the region a9 to a process p3. For example, the particle simulation apparatus 100 assigns the region a8 to a process p2. For example, the particle simulation apparatus 100 assigns the region a1 to a process p1. Assignment may thereby be avoided of the regions each including a large number of particles to the same one process.

The particle simulation apparatus 100 sequentially assigns the unassigned regions in descending order of the number of particles of each of the unassigned regions other than the already assigned predetermined number of regions of the plural regions to the processes identified based on the number of particles of each of the regions already assigned to the processes of the predetermined number.

For example, the particle simulation apparatus 100 calculates the average particle number to be simulated by each of the predetermined number of processes by dividing the total number of the particles in the space 101 to be analyzed by the predetermined number. The average particle number is also represented by, for example, "mc". For example, the particle simulation apparatus 100 sequentially assigns the unassigned regions in descending order of the number of particles in each of the unassigned regions to the processes for each of which the total particle number of the particle number of the regions already assigned thereto and the particle number of the unassigned region does not exceed the average particle number mc. For the above, an example where the assignment is executed so that the total particle number does not exceed the average particle number mc will be described in detail with reference to Example 1 described later.

For example, the particle simulation apparatus 100 sequentially assigns the unassigned regions in descending order of the number of particles included in each of the unassigned regions to the process having the lowest number of particles of those included in the regions already assigned to each of the predetermined number of processes. The example where the unassigned regions are sequentially assigned to the process having the lowest number of particles included in the regions already assigned thereto will be described in detail with reference to Example 2 described later.

FIG. 1 depicts the example where the particle simulation apparatus 100 sequentially assigns regions to the process having the lowest number of particles included in the regions already assigned thereto. For example, the particle simulation apparatus 100 assigns the region a5 to the process p1 because the process having the lowest number of particles included in the regions already assigned thereto is the process p1. For example, after assigning the region a5, the particle simulation apparatus 100 assigns the region a6 to the process p2 because the process having the lowest number of particles included in the regions already assigned thereto is the process p2. At this time, the number of particles included in the regions already assigned to the process p1 is 1,200. The number of particles included in the regions already assigned to the process p2 is 1,300.

For example, after assigning the region a6, the particle simulation apparatus 100 assigns the region a2 to the process p3 because the process having the lowest number of particles included in the regions already assigned thereto is the process p3. For example, after assigning the region a2, the particle simulation apparatus 100 assigns the region a3 to the process p4 because the process having the lowest number of particles included in the regions already assigned thereto is the process p4.

In this manner, the regions whose loads are each estimated to be large are first assigned to the processes and the regions whose loads are each small are assigned such that the loads of the processes are equalized to each other by the remaining unassigned regions among the processes. Equalization of the loads during the parallel calculation may thereby be facilitated and realization of efficient parallel processing may be facilitated.

Before describing the present embodiment in detail, the simulation using the particle method will briefly be described with reference to FIGS. 2 to 5.

FIG. 2 is an explanatory diagram of an example of an influential region of a particle and the particles in the neighbor thereof. For example, noting a particle i, the particle i interacts with the plural particles present in the neighbor thereof that is within a radius h from the particle i. For example, the distance between a particle j and the particle i is $|x-x'|$ and is shorter than the radius h. An interaction therefore occurs between the particles j and i. As to the particles, the span of the interaction is also referred to as "influential region". The radius h determining the span of the interaction is also referred to as "influential radius". The interaction in this case is an interaction in the simulation.

Figure 3:
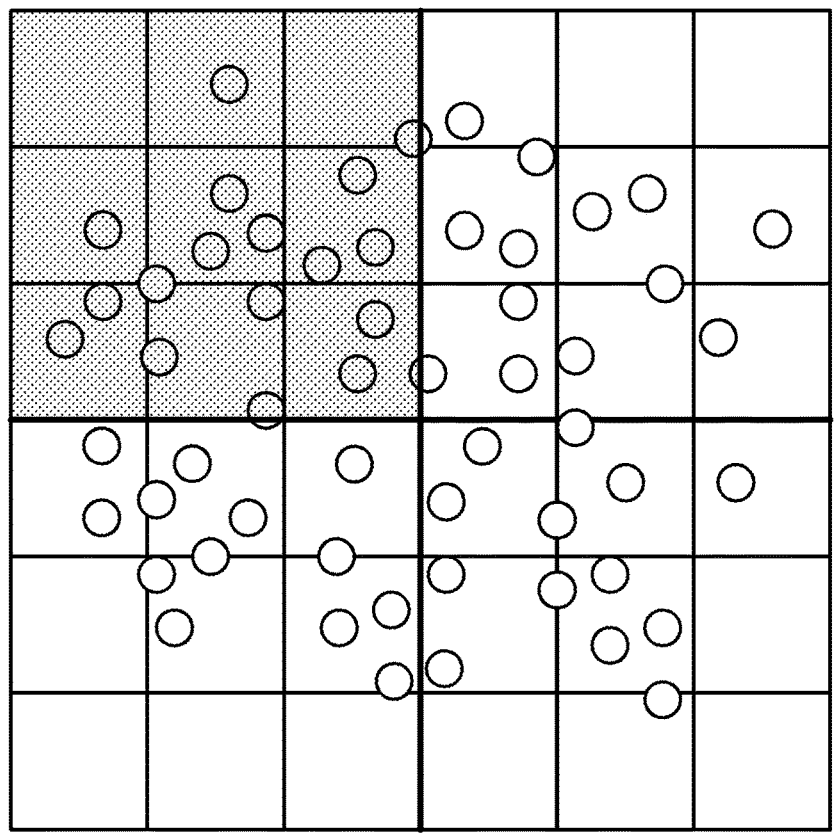
FIG. 3 is an explanatory diagram of an example of domain decomposition.

FIG. 3 is an explanatory diagram of an example of the domain decomposition. A domain decomposition method is a technique according to which a region to be calculated is divided and the regions are assigned to calculation nodes to thereby execute calculation in parallel. FIG. 3 depicts an example where the division is executed for the divided regions to each be a cube. As described, for example, with the technique of dividing the region for the calculation loads to be equalized to each other, to divide the region into cuboids as in FIG. 3 is difficult when the shape of the distribution of the positions of the particles included in the space 101 to be analyzed is complicated.

Figure 4:
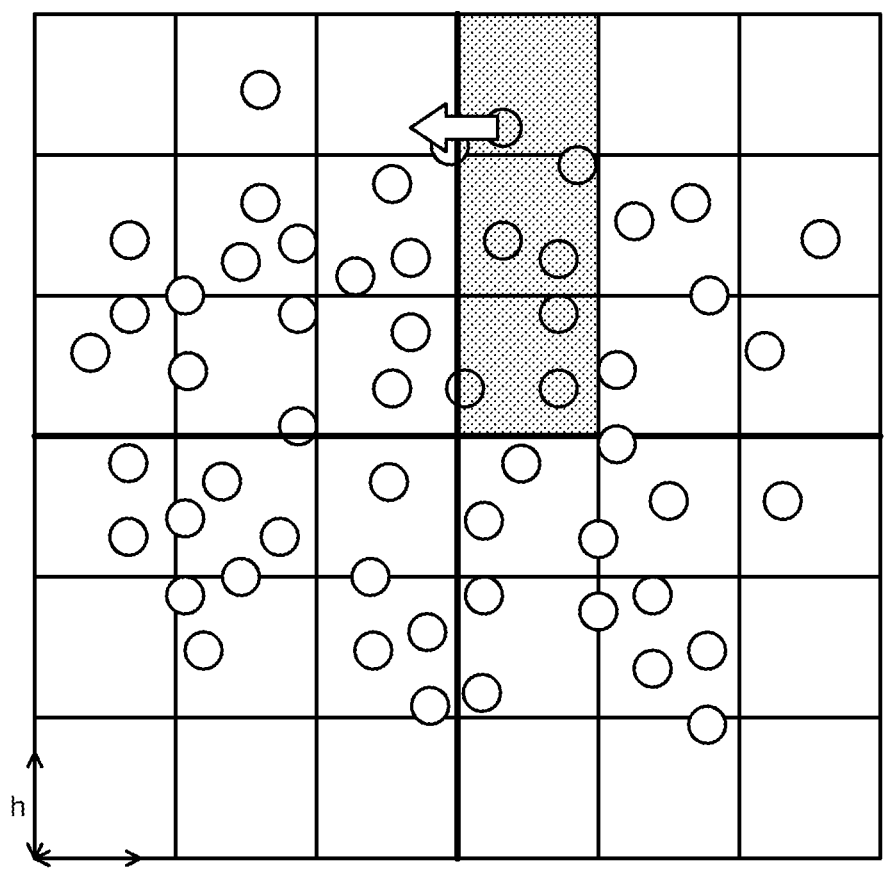
FIG. 4 is an explanatory diagram of an example of communication of skirt particles.

FIG. 4 is an explanatory diagram of an example of communication of skirt particles. As to a particle, the particle is influenced by the particles present in the influential span as depicted in FIG. 2. For a particle, the particles present in the influential span thereof are also referred to as "skirt particles". The skirt particles influence the particles included in the regions adjacent to the region including the skirt particles. The skirt particles are, therefore, identified for the particles included in the region in the simulation using the particle method. In the simulation using the particle method, when the identified skirt particles are in the regions adjacent to the region, the process to which the region is assigned obtains particle data on the skirt regions using communication between the processes between the process to which the region is assigned and the process to which the adjacent regions are assigned. The particle data includes, for example, information on the particle such as the position, the mass, and the volume thereof.

Figure 5:
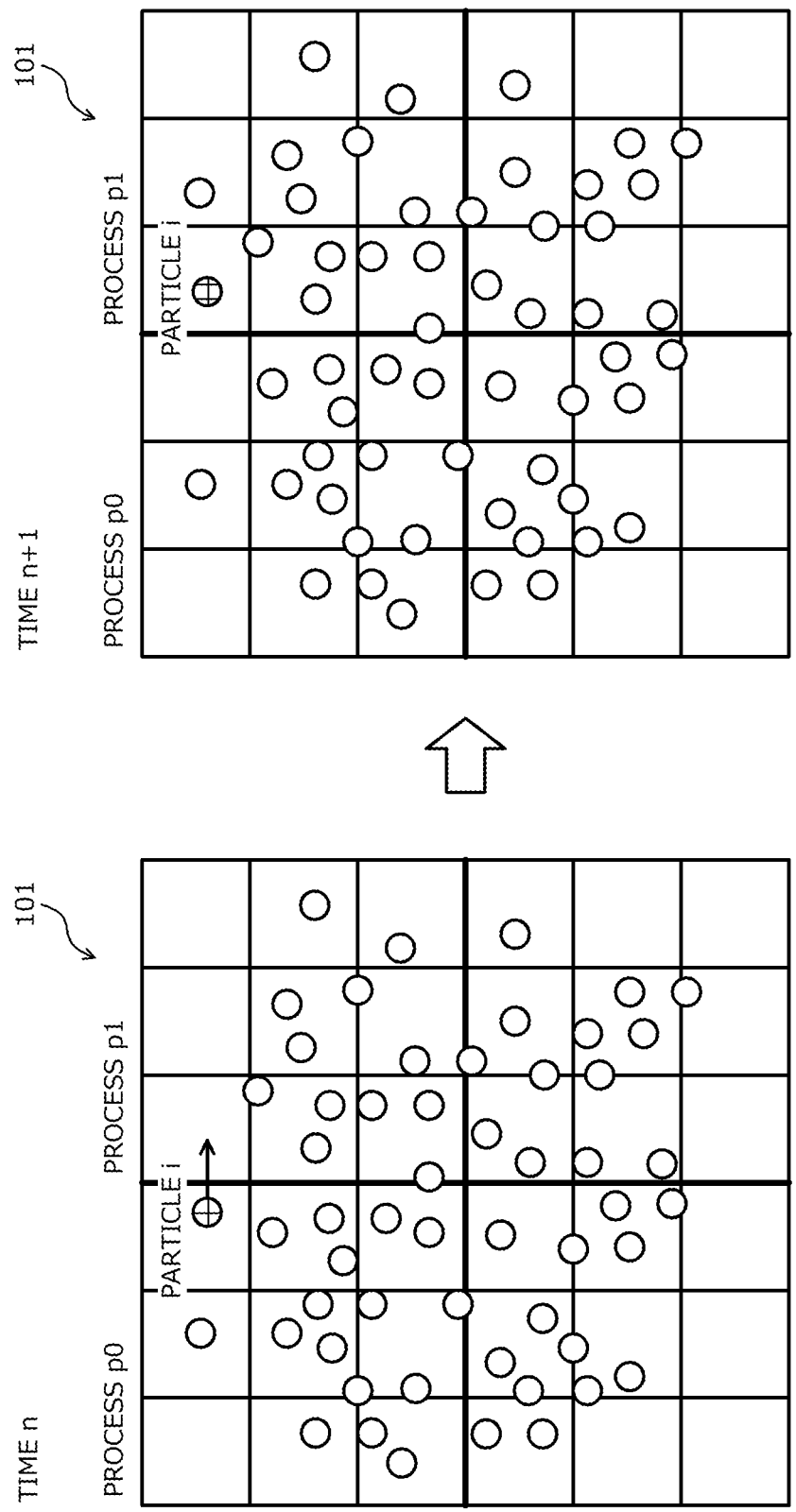
FIG. 5 is an explanatory diagram of an example of communication of particles across a border of regions.

FIG. 5 is an explanatory diagram of an example of the communication of the particles across the border of the regions. The particles move in the region. For example, at a time n, the particle i is included in a region assigned to a process p0. For example, at a time n+1, the particle i is included in the region assigned to the process p1.

In this manner, the simulation using the particle method is executed by advancing the time by a predetermined unit similarly to the elapse of the actual time. When a particle moves into a region different from the previous one by the movement of the particle such as the particle i, the particle data is communicated by the communication between processes, or the like to move the particle in the simulation.

The particle simulation apparatus 100 according to the present embodiment will be described in detail.

Figure 6:
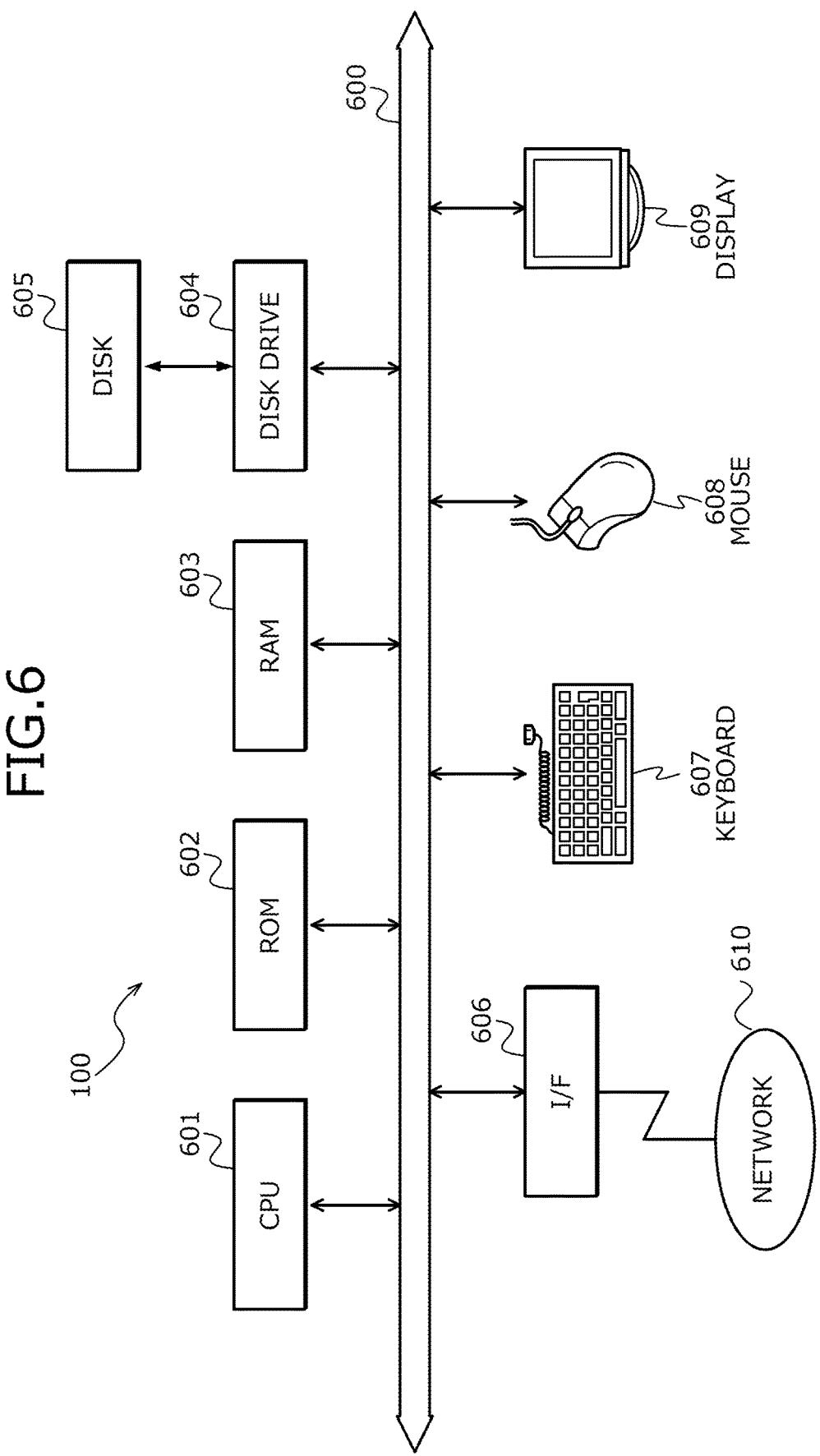
FIG. 6 is a diagram depicting an example of hardware configuration of the particle simulation apparatus.

FIG. 6 is a diagram depicting an example of hardware configuration of the particle simulation apparatus. The particle simulation apparatus 100 has a central processing unit (CPU) 601, random access memory (ROM) 602, and random access memory (RAM) 603. The particle simulation apparatus 100 further has a disk drive 604, and a disk 605. The particle simulation apparatus 100 has an interface (I/F) 606, a keyboard 607, a mouse 608, and a display 609. Further, the CPU 601, the ROM 602, he RAM 603, the disk drive 604, the I/F 606, the keyboard 607, the mouse 608, and the display 609 are connected by a bus 600, respectively.

The CPU 601 governs overall control of the particle simulation apparatus 100. The ROM 602 stores programs such as a boot program. The RAM 603 is used as a work area of the CPU 601. The disk drive 604, under the control of the CPU 601, controls the reading and writing of data with respect to the disk 605. The disk 605 stores data written thereto under the control of the disk drive 604. The disk 605 may be a magnetic disk, an optical disk, and the like.

The I/F 606 is connected through a communications line to a network 610 such as a local area network (LAN), a wide area network (WAN), and the Internet, and is connected to external devices via the network 610. The I/F 606 administers an internal interface with the network 610 and controls the input and output of data from external devices. The I/F 606 may be, for example, a modem, a LAN adapter, and the like.

The keyboard 607 and the mouse 608 are interfaces that input various types of data by user operation. The display 609 is an interface that outputs data according to the instruction of the CPU 601.

Although not depicted, the particle simulation apparatus 100 may include an input device that takes in an image or a video image from a camera and another input device that captures sound from a microphone. Although not depicted, the particle simulation apparatus 100 may have an output device such as a printer.

A personal computer is taken as an example of a hardware configuration of the particle simulation apparatus 100 in the present embodiment. Nonetheless, the hardware configuration is not limited to this and a server or the like may be used. When the particle simulation apparatus 100 is a server, the particle simulation apparatus 100, and an apparatus operable by a user or the display 609 may be connected to each other through the network 610.

Figure 7:
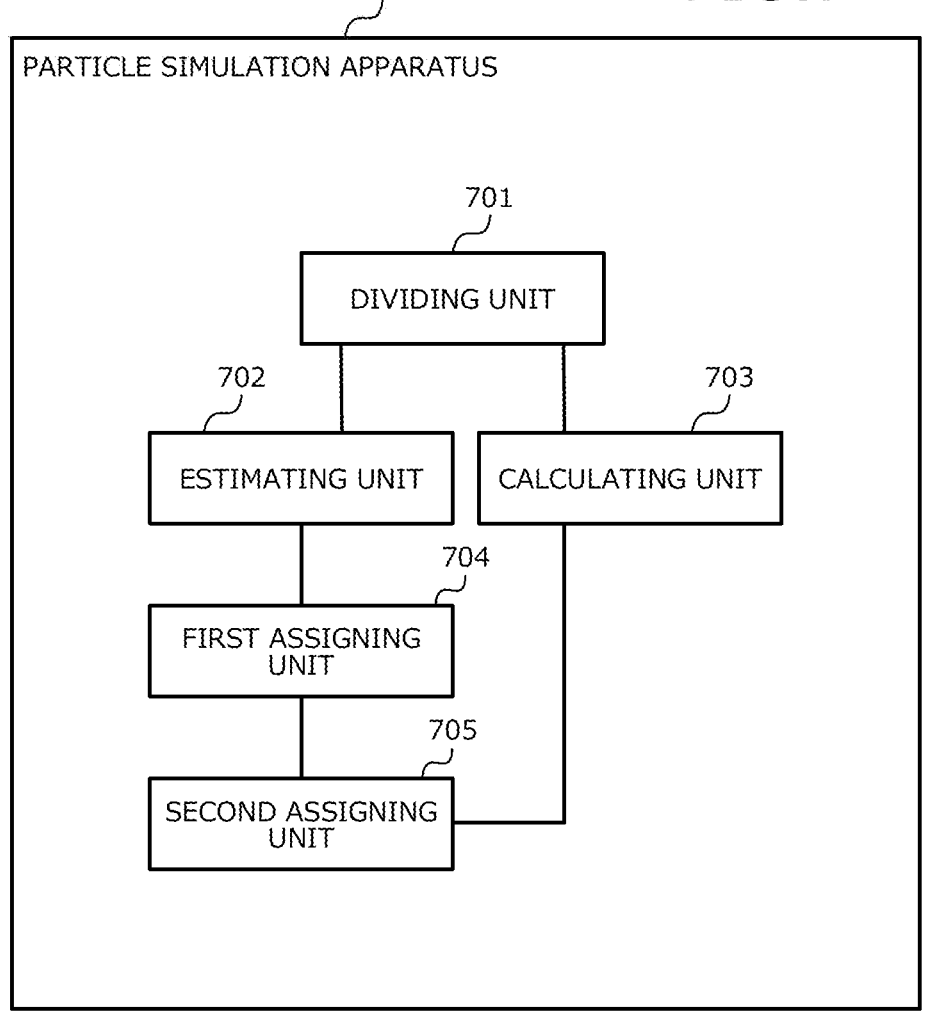
FIG. 7 is a block diagram of an example of a functional configuration of the particle simulation apparatus 100.

FIG. 7 is a block diagram of an example of the functional configuration of the particle simulation apparatus 100. The particle simulation apparatus 100 includes a dividing unit 701, an estimating unit 702, a calculating unit 703, a first assigning unit 704, and a second assigning unit 705. Processing by a control unit including the dividing unit 701 to the first assigning unit 704 is coded in, for example, a program stored in a storage device such as the ROM 602, the RAM 603, or the disk 605 accessible by the CPU 601 depicted in FIG. 6. The CPU 601 reads the program from the storage device and executes processing coded in the program, whereby the processing executed by the control unit is realized. Results of the processing executed by the control unit are stored to, for example, a storage device such as the RAM 603, the ROM 602, or the disk 605.

As described, in the present embodiment, the particle simulation apparatus 100 simulates the behavior of particles in the space 101 to be analyzed that includes the plural regions, using the predetermined number of processes. As described, the predetermined number, for example, may be the number of calculation nodes or a multiple of the number of calculation nodes, or may be a number determined by an analyst performing the analysis. The predetermined number is also represented by, for example, "np" and is also referred to as "the number of processes" as above.

The dividing unit 701 divides the space 101 to be analyzed into plural regions at a timing determined in advance. For example, the dividing unit 701 divides the space 101 to be analyzed into the plural regions each time the simulation sessions of about the number determined in advance come to an end. Each of the plural regions is, for example, a cuboid. The faces of adjacent regions among the plural regions are shared. Processing of identifying the adjacent regions thus does not consume a long time and the data communication between the regions for moving of the particles and the skirt regions becomes simple. Reduction of the communication time period can thereby be facilitated.

Figure 8:
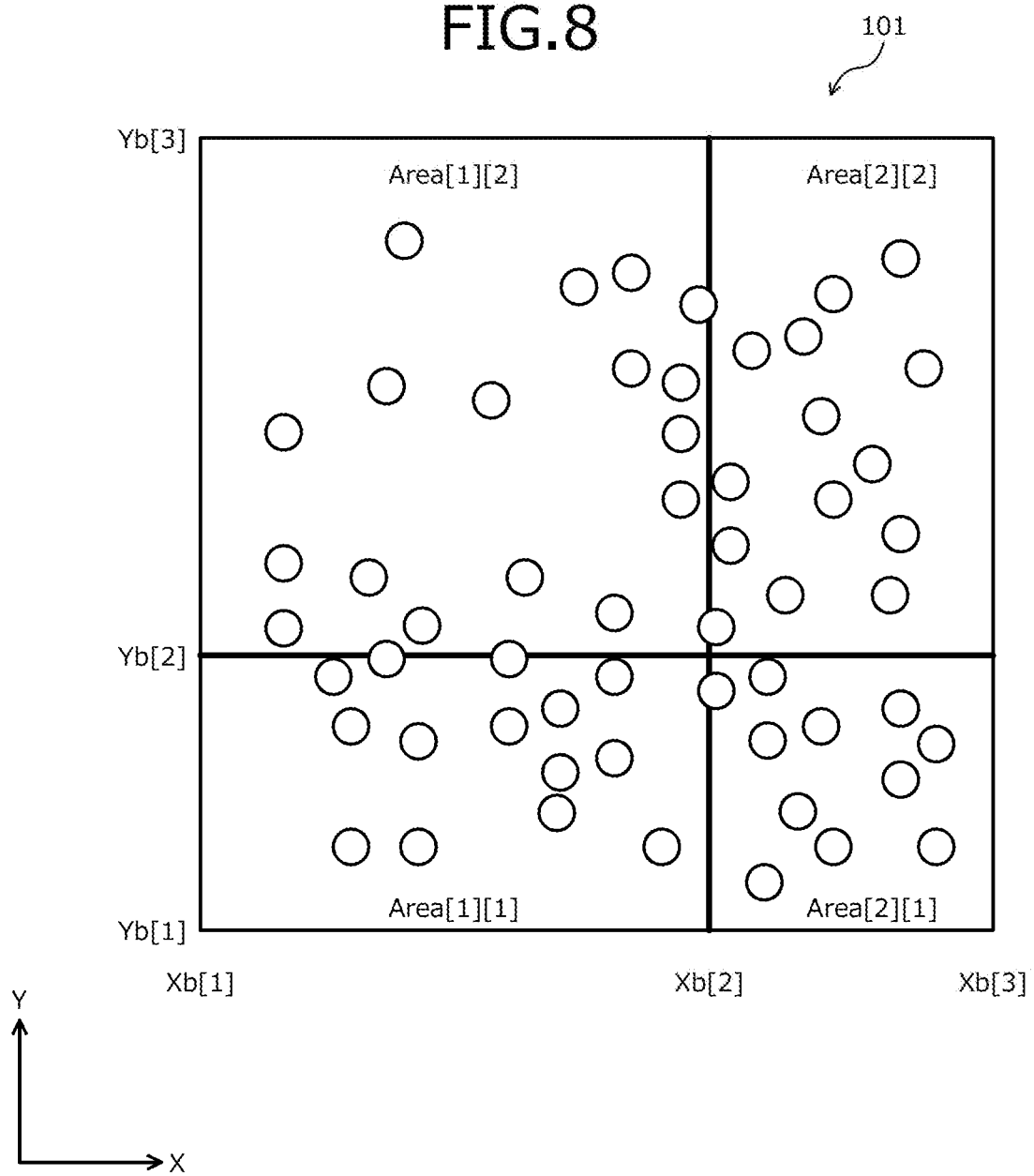
FIG. 8 is an explanatory diagram of an example of the domain decomposition.

FIG. 8 is an explanatory diagram of an example of the domain decomposition. In the example of FIG. 8, some of the regions included in the space 101 to be analyzed are represented in the two dimensions of the X-axis and the Y-axis. In the example of FIG. 8, the space 101 to be analyzed is divided into, for example, four regions that are Area[1] [1], Area[1] [2], Area[2] [1], and Area[2] [2]. The regions are each defined by border lines.

"Xb[1]", "Xb[2]", and "Xb[3]" are the positions of the border lines along the X-axis direction as depicted in FIG. 10 described later. Xb[1], Xb[2], and Xb[3] are, for example, in ascending order the coordinate values. "Yb[1]", "Yb[2]", and "Yb[3]" are the positions of the border lines along the Y-axis direction as depicted in FIG. 10 described later. Yb[1], Yb[2], and Yb[3] are, for example, in ascending order of the coordinate values. Description will be made using the X-axis and the Y-axis in the example of FIG. 8, however, the positions of the border lines are also set on the Z-axis.

The particles included in the region are identified based on the positions of the border lines of the region and the positions of the particles. FIG. 9 depicts particle data and FIG. 10 depicts border line data.

FIG. 9 is an explanatory diagram of an example of particle data. Particle data 900 is, for example, information indicating the particles. The particle data 900 has, for example, fields for the particle number and the position information. The fields are stored as a record by setting information in each of the fields.

Identification information identifying the particles is set in the particle number field. In this case, each of the particles is identified by giving serial numbers to the particles. The position information field has the coordinate values for X, Y, and Z set therein that represent the position of each of the particles. The particles move as described above and the position information is therefore updated according to the movement of the particles. Although not depicted, the particle data 900 may include information such as the mass and the volume.

FIG. 10 is an explanatory diagram of an example of region data. Region data 1000 is information indicating border lines to distinguish the regions from each other. Border line data has, for example, fields for the number of border lines along the X-axis direction, the X-coordinate values of the border lines, the number of border lines along the Y-axis direction, the Y-coordinate values of the border lines, the number of border lines along the Z-axis direction, and the Z-coordinate values of the border lines. The border line data is newly produced when domain decomposition is executed.

The number of border lines that are disposed along the X-axis direction is set in the field for the number of X-axis direction border lines. The X-coordinate values of the border lines that are disposed along the X-axis direction are set in the field for the X-axis coordinate values of the border lines.

The number of border lines disposed along the X-axis direction is, for example, xm. The X-coordinate values of the border lines disposed along the X-axis direction are, for example, Xb[1] to Xb[xm]. The number of border lines disposed along the Y-axis direction is, for example, ym. The Y-coordinate values of the border lines disposed along the Y-axis direction are, for example, Yb[1] to Yb[ym]. The number of border lines disposed along the Z-axis direction is, for example, zm. The Z-coordinate values of the border lines disposed along the Z-axis direction are, for example, Zb[1] to Zb[zm]. In this example, the coordinate values of the border lines are arranged, for example, in ascending order of coordinate values along the directions of each of the axes.

The regions can be identified using the region data 1000. As to the regions, the number of regions may be calculated by (xm−1)×(ym−1)×(zm−1). For example, region numbers identify a region using three indexes for each axis may be defined.

For example, a region is defined as "region (o,p,q)". In this case, "o", "p", and "q" are respectively "1≤o<xm", "1≤p<ym", and "1≤q<zm". For example, the particles included in the region (o,p,q) are the particles that each satisfy all of conditions (1) to (3) below.

(1) Xb[o]X-coordinate value of the particle<Xb[o+1]
(2) Yb[p]Y-coordinate value of the particle<Yb[p+1]
(3) Zb[q]Z-coordinate value of the particle<Zb[q+1]

For example, whether a particle p is included in the region (o,p,q) may be determined based on a determination of whether the particle p satisfies the conditions. In this case, the number of regions nd<the predetermined number np, as described above.

Figure 11:
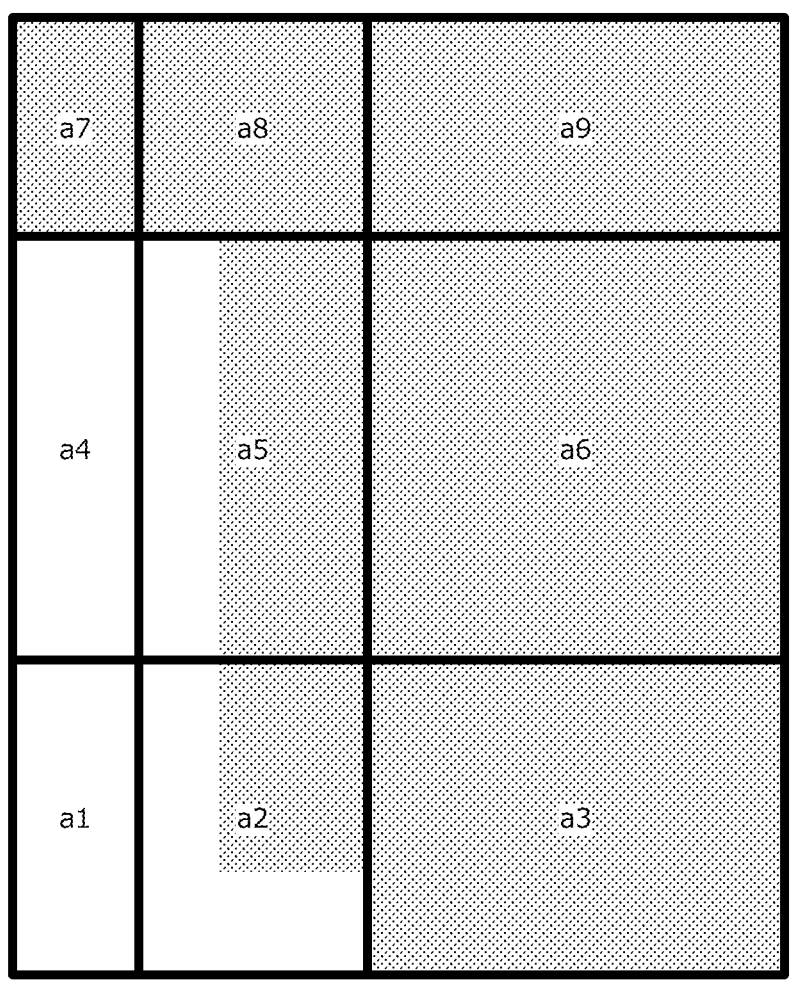
FIG. 11 is an explanatory diagram of an example of the domain decomposition.

FIG. 11 is an explanatory diagram of an example of the domain decomposition. FIG. 11 depicts an example where the number of regions from the region a1 to the region a9 is nine. Thick lines are the borders of the regions. A hatched portion indicates a portion where the particle is overcrowded.

The number of particles included in a region, or the total number of particles included in the region and particles included in the skirt regions of the region may be used as an evaluation value that indicates the amount of calculation necessary when the region is simulated. In the example of FIG. 1, the number of particles included in the region is used as the evaluation value. In the description below, the total number particles included in the region and particles included in the skirt regions of the region is used as the evaluation value.

The estimating unit 702 estimates for each of the plural regions, the number of particles included in the regions present within a predetermined distance from the region of the space 101 to be analyzed based on the number of particles included in the region. To estimate the number of particles is to calculate an estimated value of the number of particles included in the regions present within the predetermined distance from the region of the space 101 to be analyzed.

For example, the estimating unit 702 identifies the number of particles included in the region for each of the regions. As described above, the estimating unit 702 extracts the particles that each satisfies the conditions (1) to (3), for each of the regions based on the particle data 900 and the region data 1000. The estimating unit 702 identifies the number of extracted particles for each of the regions.

The estimating unit 702 calculates the estimated value of the number of particles included in the skirt regions based on the number of particles included in the region and the volume of the skirt regions.

Figure 12:
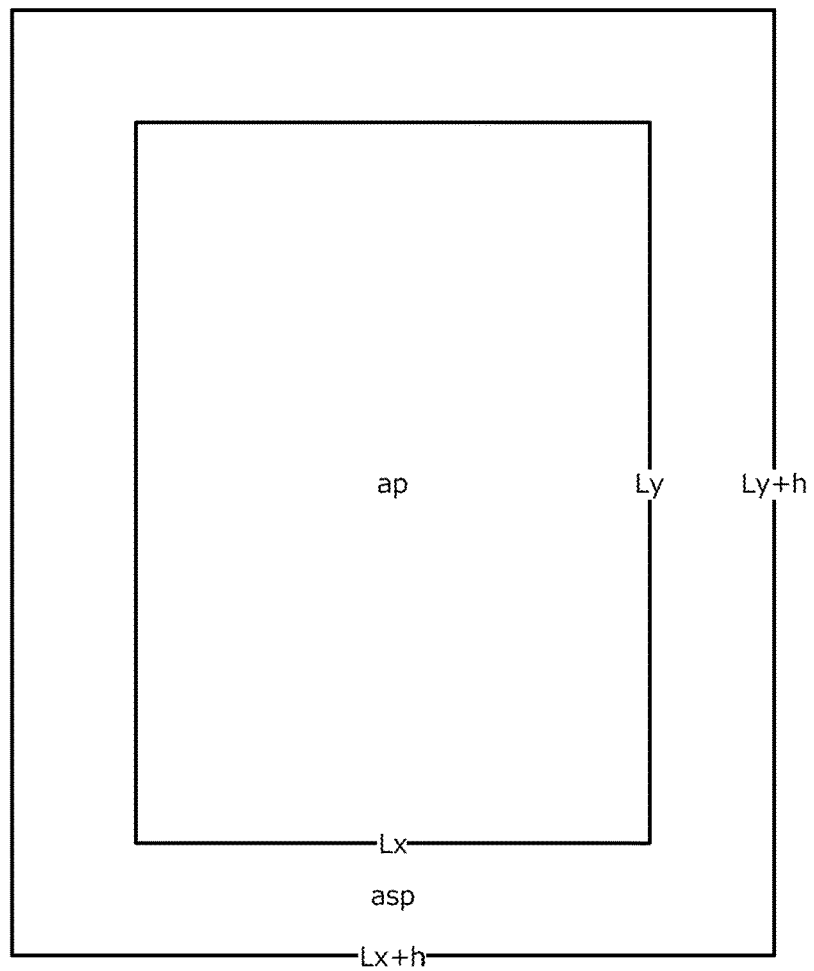
FIG. 12 is an explanatory diagram of an example of the region and the skirt regions.

FIG. 12 is an explanatory diagram of an example of the region and the skirt regions. For example, for a region ap having a length in the x direction that is Lx and a length in the y direction that is Ly, when the influential radius is h, the estimating unit 702 calculates the size of the skirt region asp by "2(Lx+Ly+2h)×h".

When the size of the target region is (Lx×Ly) and the number of particles included in the region is nx, the estimating unit 702 calculates the estimated value of the number of particles included in the skirt region by "(2(Lx+Ly+2h)× h/(Lx×Ly))×nx".

The estimating unit 702 calculates an evaluation value indicating the calculation load based on the number of particles included in the region and the calculated estimated value of the number of particles included in the skirt regions for each of the plural regions. The calculation load represents the calculation load in a case where the behavior of the particles included in the region is simulated and the communication load generated by the communication between the particles included in the region and the particles included in the regions present within the predetermined distance therefrom. The surrounding regions present within the predetermined distance from the region are also referred to as "skirt regions". An example of the skirt region will be described later with reference to FIG. 12. The predetermined distance is set to be, for example, the influential radius that determines the span of interaction depicted in FIG. 2. As described above, because the particles included in the region are influenced by the skirt particles present within the influential radius, the particle data 900 for the skirt regions is also used when the behavior of the particles included in the region is simulated. The evaluation value including the communication load may therefore be calculated and the equalization may be facilitated for the calculation loads for the behavior of the particles of each of the processes by estimating the number of particles included in the skirt regions based on the number of particles included in the region.

The estimating unit 702 calculates the total value of the number of particles included in the region and the number of particles included in a×skirt regions, as the evaluation value for the region. "a" is a real number that represents the ratio of the communication cost and the calculation cost per one particle. For example, the estimating unit 702 may calculate the evaluation value by equation (1).

$$\text{evaluation value} = nx + a \times 2(Lx + Ly + 2h) \times h / (Lx \times Ly) \times nx \quad (1)$$

For example, the first assigning unit 704 assigns to each of processes that differ from each other among the predetermined number np of processes, the predetermined number np of regions selected in descending order of the number of particles included in each of the plural regions.

A case will be described where the total number of particles included in the region and particles included in the skirt regions is used as the evaluation value. For example, the first assigning unit 704 assigns to each of the processes that differ from each other among the predetermined number np of processes, the predetermined number np of regions selected in descending order of the number of total particles calculated for each of the plural regions from the plural regions.

Figure 13:
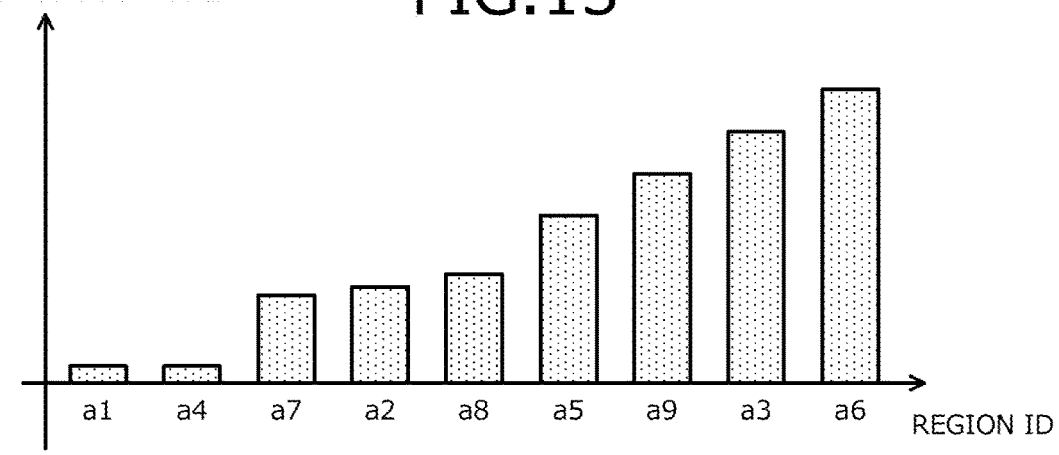
FIG. 13 is an explanatory diagram of an example of a descending order of evaluation values.

FIG. 13 is an explanatory diagram of an example of a descending order of evaluation values. FIG. 13 depicts an example where the regions a1 to a9 depicted in FIG. 11 are arranged in descending order of evaluation values calculated for each of the regions. For example, the descending order of evaluation values is the order of the region a6, the region a3, the region a9, the region a5, the region a8, the region a2, the region a7, the region a4, and the region a1.

For example, the first assigning unit 704 assigns to each of the processes that differ from each other among the predetermined number np of processes, the predetermined number np of regions selected in descending order of evaluation values of the plural regions.

FIG. 14 is an explanatory diagram of an example where the assignment is executed in descending order of evaluation values. A case where the predetermined number np, which is the number of the processes, is six will be taken as an example. For example, the first assigning unit 704 assigns the six regions in descending order of evaluation values to six processes. For example, the first assigning unit 704 sequentially assigns the region a6, the region a3, the region a9, the region a5, the region a8, and the region a2 in this order to the processes each having a small number of processes among the predetermined number np of processes.

For example, the region a6 is assigned to the process p1 and the region a3 is assigned to the process p2. For example, the region a7, the region a4, and the region a1 are unassigned regions.

For example, the second assigning unit 705 sequentially assigns the unassigned regions in descending order of number of particles included in each of the unassigned regions to processes identified based on the number of particles included in each of the regions already assigned to each of the predetermined number np of processes. The unassigned regions are the regions other than the predetermined number np of regions assigned to the processes that are different from each other by the first assigning unit 704 of the plural regions. An example of assignment by the second assigning unit 705 will be described distinguishing Example 1 and Example 2 from each other.

In Example 1, the particle simulation apparatus 100 assigns the unassigned regions to the processes such that the total number of particles included in the already assigned regions and particles included in the unassigned region does not exceed the average particle number mc. Thus, the regions may be assigned to the processes such that the numbers of particles are equalized. Thus, improvement of the efficiency of the parallel computation may be facilitated. The "improvement of the efficiency of the parallel computing" refers to improvement of the processing time period necessary for the number of particles. For example, when the number of particles assigned to each of the processes is equalized, the processing time period necessary for each of the processes is equalized and thus, reduction of the processing time period may be facilitated.

For example, the calculating unit 703 calculates the average particle number mc to be simulated by each of the predetermined number np of processes, by dividing the total number of particles in the space 101 to be analyzed by the predetermined number np. The predetermined number is the number of processes as described above. In this case, the behavior of the particles in the space 101 to be analyzed that has the plural regions is simulated by the predetermined number np of processes. As described above, the predetermined number np may be, for example, the number of calculation nodes that execute the predetermined number np of processes or a multiple of the number of calculation nodes.

For example, the second assigning unit 705 assigns each of the unassigned regions to processes of the predetermined number np among processes based on the calculated average particle number mc.

The second assigning unit 705 assigns the regions to processes of the predetermined number np among processes for each of the unassigned regions based on the calculated average particle number mc. For example, the second assigning unit 705 determines whether the total value of the evaluation values of the case where the unassigned regions are assigned exceeds the average particle number.

For example, when the second assigning unit 705 determines that the total value exceeds the average particle number mc, the second assigning unit 705 does not assign the unassigned region to the process. On the other hand, for example, when the second assigning unit 705 determines that the total value does not exceed the average particle number mc, the second assigning unit 705 assigns the unassigned regions to the processes.

Figure 15:
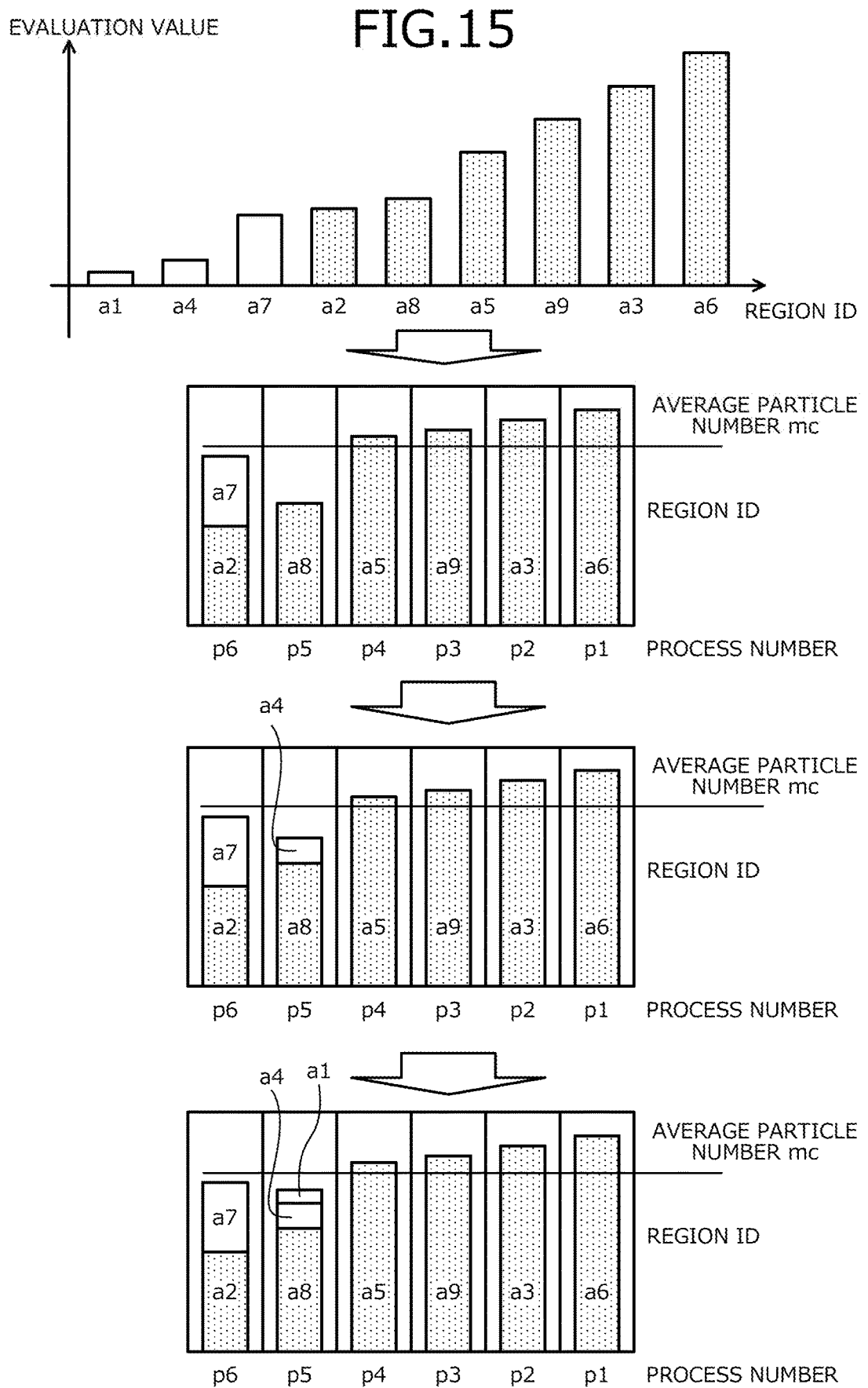
FIG. 15 is an explanatory diagram of an example where assignment is executed such that a total value does not exceed an average particle number.

FIG. 15 is an explanatory diagram of an example where the assignment is executed such that the total value does not exceed the average particle number. In this example, for example, the second assigning unit 705 establishes candidate processes as assignment destinations in descending order of process numbers. Thus, candidate processes for the assignment destinations may be established in ascending order of evaluation values for the regions assigned by the first assigning unit 704.

For example, the second assigning unit 705 assigns the region a7 to the process p6 because the total evaluation value of the evaluation value for the region a2 already assigned to the process p6 and the evaluation value for the region a7 does not exceed the average particle number mc.

For example, the second assigning unit 705 does not assign the region a4 to the process p6 because the total evaluation value of the evaluation values for the region a2 and the region a7 already assigned to the process p6 and the evaluation value for the region a4 exceeds the average particle number mc. For example, the second assigning unit 705 assigns the region a4 to the process p5 because the total evaluation value of the evaluation value for the region a8 already assigned to the process p5 and the evaluation value for the region a4 does not exceed the average particle number mc.

For example, the second assigning unit 705 assigns the region a1 to the process p5 because the total evaluation value of the evaluation values for the region a8 and the region a4 already assigned to the process p5 and the evaluation value for the region a1 does not exceed the average particle number mc.

Equalization of the evaluation values for the regions assigned to each of the processes can be facilitated based on the average particle number mc. The amount of calculation necessary for the assignment is the predetermined number "np+(2×(nd−np)×(the average number of regions retained by one process))". The predetermined number np is an index value of the calculation amount for the first assignment session executed by the first assigning unit 704. "np+(2×(nd−np)×(the average number of regions retained by one process))" is an index value of the calculation amount of the second and subsequent assignment sessions executed by the second assigning unit 705. "The average number of regions retained by one process" is (the number nd of regions/the predetermined number np).

In the example of FIG. 15, to simplify the assignment process, whether the evaluation value exceeds the average particle number mc is determined using the process p5 as the candidate process to which the region a1 is assigned, nonetheless, the determination is not limited hereto. For example, the second assigning unit 705 may use the process p6 having a large process number as the candidate process to be the assignment destination. For example, the second assigning unit 705 may determine whether the total evaluation value of the evaluation values for the region a2 and the region a7 already assigned to the process p6 and the evaluation value for the region a1 exceeds the average particle number mc. For example, when the second assigning unit 705 determines that the total evaluation value does not exceed the average particle number mc, the second assigning unit 705 assigns the region a1 to the process p6. For example, when the second assigning unit 705 determines that the total evaluation value exceeds the average particle number mc, the second assigning unit 705 may determine whether the total of the evaluation values for the region a8 and the region a4 already assigned to the process p5 and for the region a1 exceeds the average particle number mc.

Figure 16:
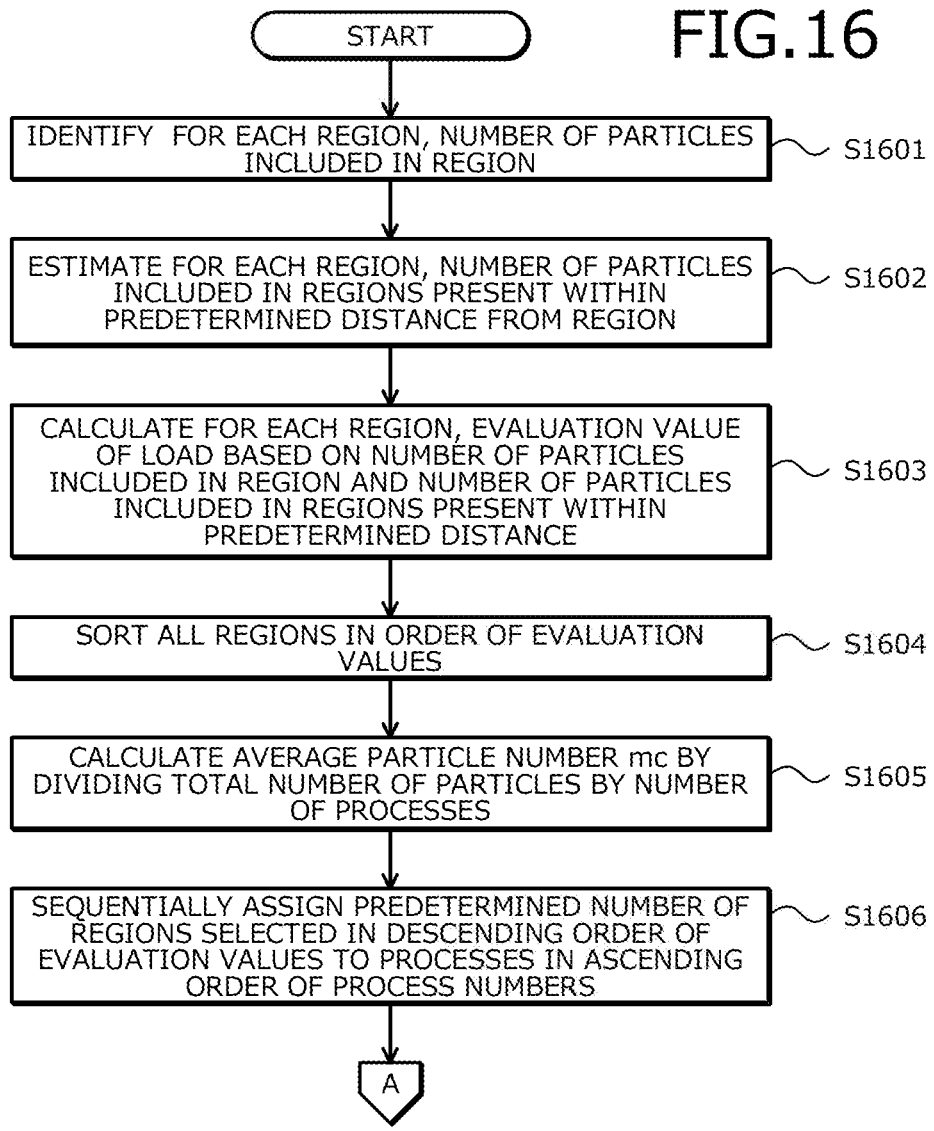
FIGS. 16, 17, and 18 are flowcharts of an example of a procedure for an assignment process executed by the particle simulation apparatus.
Figure 17:
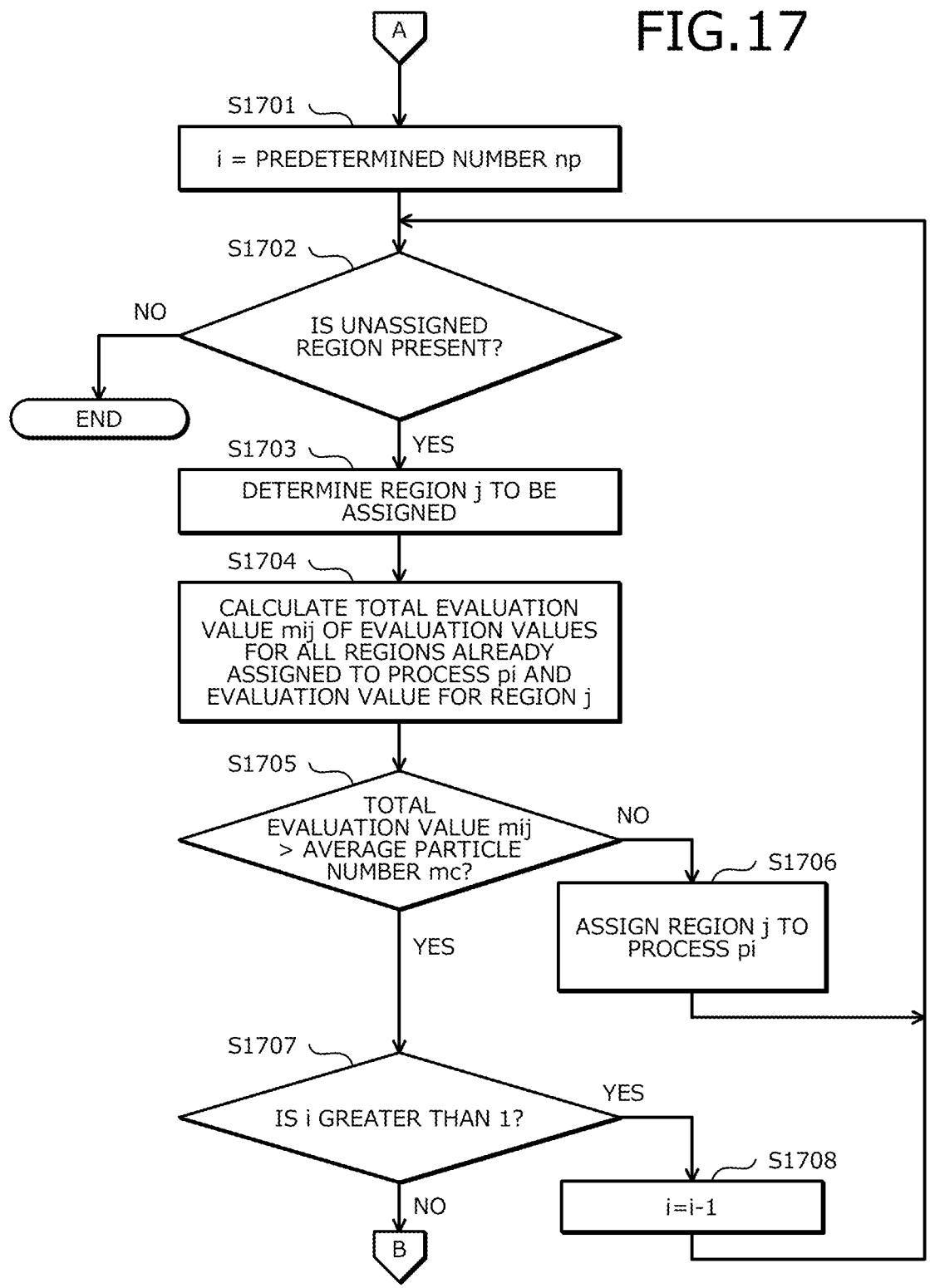
Figure 18:
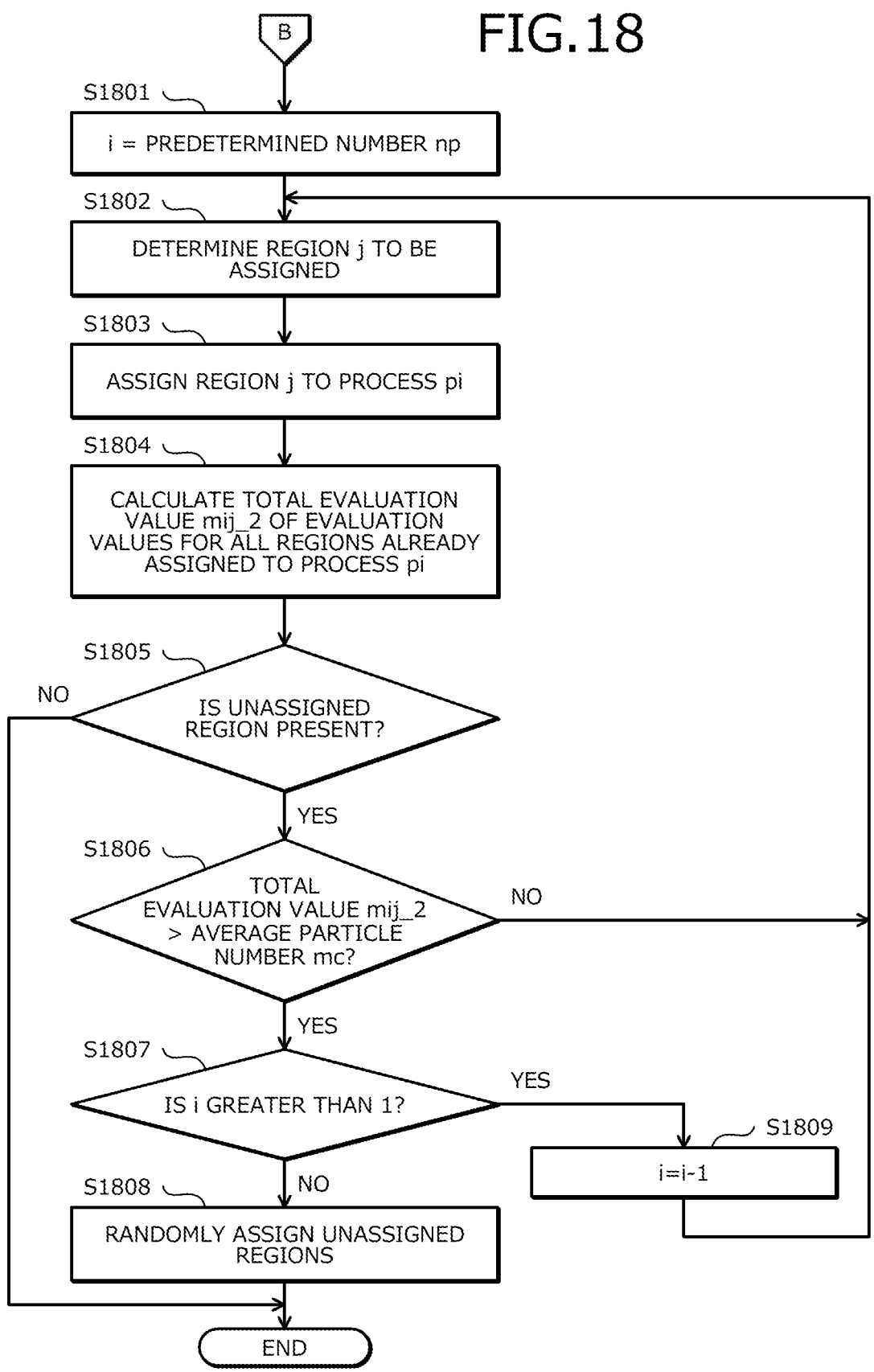

FIGS. 16, 17, and 18 are flowcharts of an example of the procedure for the assignment process executed by the particle simulation apparatus. The particle simulation apparatus 100 identifies the number of particles included in a region for each of the regions (step S1601). The particle simulation apparatus 100 estimates for each of the regions, the number of particles included in the regions present within the predetermined distance from the region of the space 101 to be analyzed, based on the ratios of the size of the region and the sizes of the regions present within the predetermined distance, and the number of particles included in the region (step S1602).

The particle simulation apparatus 100 calculates for each of the regions, the evaluation value of the load based on the number of particles included in the region and the estimated number of particles included in the regions present within the predetermined distance (step S1603). The particle simulation apparatus 100 sorts all the regions in the order of the evaluation values (step S1604).

The particle simulation apparatus 100 calculates the average particle number mc by dividing the total number of particles by the number of the processes (step S1605). The particle simulation apparatus 100 sequentially assigns the predetermined number of regions selected in descending order of evaluation values to the processes in ascending order of process numbers (step S1606).

The particle simulation apparatus 100 sets i to be i=the predetermined number np (step S1701). The particle simulation apparatus 100 determines whether an unassigned region is present (step S1702). When the particle simulation apparatus 100 determines that no unassigned region is present (step S1702: NO), the particle simulation apparatus 100 causes the series of process steps to come to an end. When the particle simulation apparatus 100 determines that an unassigned region is present (step S1702: YES), the particle simulation apparatus 100 determines the region to be assigned (step S1703).

The particle simulation apparatus 100 calculates the total evaluation value mij of the evaluation values for all the regions already assigned to a process p1 and the evaluation value for a region j (step S1704). The particle simulation apparatus 100 determines whether the total evaluation value mij is greater than the average particle number mc (step S1705). When the particle simulation apparatus 100 determines that the total evaluation value mij is not greater than the average particle number mc (step S1705: NO), the particle simulation apparatus 100 assigns the region j to the process pi (step S1706) and returns to step S1702.

When the particle simulation apparatus 100 determines that the total evaluation value mij is greater than the average particle number mc (step S1705: YES), the particle simulation apparatus 100 determines whether i is greater than one (step S1707). When the particle simulation apparatus 100 determines that i is greater than one (step S1707: YES), the particle simulation apparatus 100 sets i to be i=i−1 (step S1708) and returns to step S1702.

When the particle simulation apparatus 100 determines that i is not greater than one (step S1707: NO), the particle simulation apparatus 100 sets i to be i=the predetermined number np (step S1801). The particle simulation apparatus 100 determines the region j to be assigned (step S1802). The particle simulation apparatus 100 assigns the region j to the process pi (step S1803). The particle simulation apparatus 100 calculates the total evaluation value mij_2 of the evaluation values for all the regions already assigned to the process pi (step S1804).

The particle simulation apparatus 100 determines whether an unassigned region is present (step S1805). When the particle simulation apparatus 100 determines that no unassigned region is present (step S1805: NO), the particle simulation apparatus 100 causes the series of process steps to come to an end. When the particle simulation apparatus 100 determines that an unassigned region is present (step S1805: YES), the particle simulation apparatus 100 determines whether the total evaluation value mij_2 is greater than the average particle number mc (step S1806).

When the particle simulation apparatus 100 determines that the total evaluation value mij_2 is not greater than the average particle number mc (step S1806: NO), the particle simulation apparatus 100 returns to step S1802. When the particle simulation apparatus 100 determines that the total evaluation value mij_2 is greater than the average particle number mc (step S1806: YES), the particle simulation apparatus 100 determines whether i is greater than one (step S1807). When the particle simulation apparatus 100 determines that i is greater than one (step S1807: YES), the particle simulation apparatus 100 sets i to be i=i−1 (step S1809) and returns to step S1802.

When the particle simulation apparatus 100 determines that i is not greater than one (step S1807: NO), the particle simulation apparatus 100 randomly assigns the unassigned regions (step S1808) and causes the series of process steps to come to an end.

In Example 2, the particle simulation apparatus 100 sequentially assigns the regions to the processes and assigns the unassigned regions in ascending order of the number of particles included in each of the regions already assigned to the process. The regions can thereby be assigned to the processes such that the number of particles is equalized. Thus, improvement of the efficiency of the parallel computing may be facilitated. In Example 2, the configurations and the functions identical to those described in Example 1 are given the same reference numerals used in Example 1 and will not again be described in detail. In Example 2, the processing executed by the estimating unit 702 is same as that of Example 1 and the calculating unit 703 does not execute any processing.

For example, the second assigning unit 705 assigns the regions to processes of the predetermined number np of processes based on the order corresponding to the evaluation value for the region so as to prevent assignment of plural regions to one process. In this case, similarly to Example 1, for example, the second assigning unit 705 assigns the regions in order of descending evaluation values to the processes in order of the process number.

Figure 19:
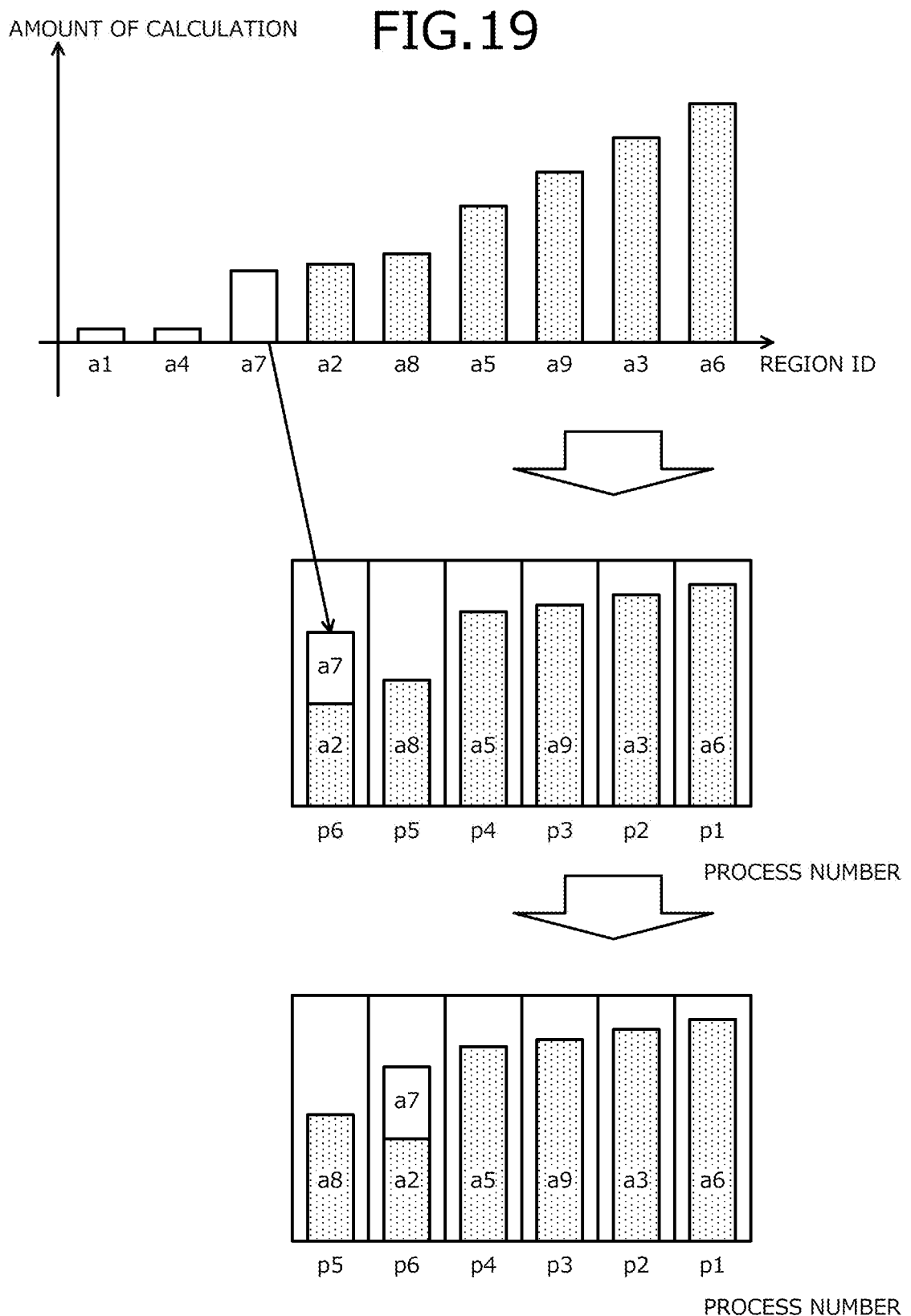
FIG. 19 is an explanatory diagram of an example where assignment to a process having a smallest evaluation value is executed.

FIG. 19 is an explanatory diagram of an example where assignment to the process having the smallest evaluation value is executed. For example, the second assigning unit 705 assigns the region a7 having the largest evaluation value of the unassigned regions to the process p6 having the smallest evaluation value for the regions already assigned thereto. For example, the second assigning unit 705 sorts the processes p1 to p6 in ascending order of evaluation values each for the regions already assigned to each thereof. In the example of FIG. 19, the process p5 has the smallest evaluation value for the regions already assigned thereto.

Figure 20:
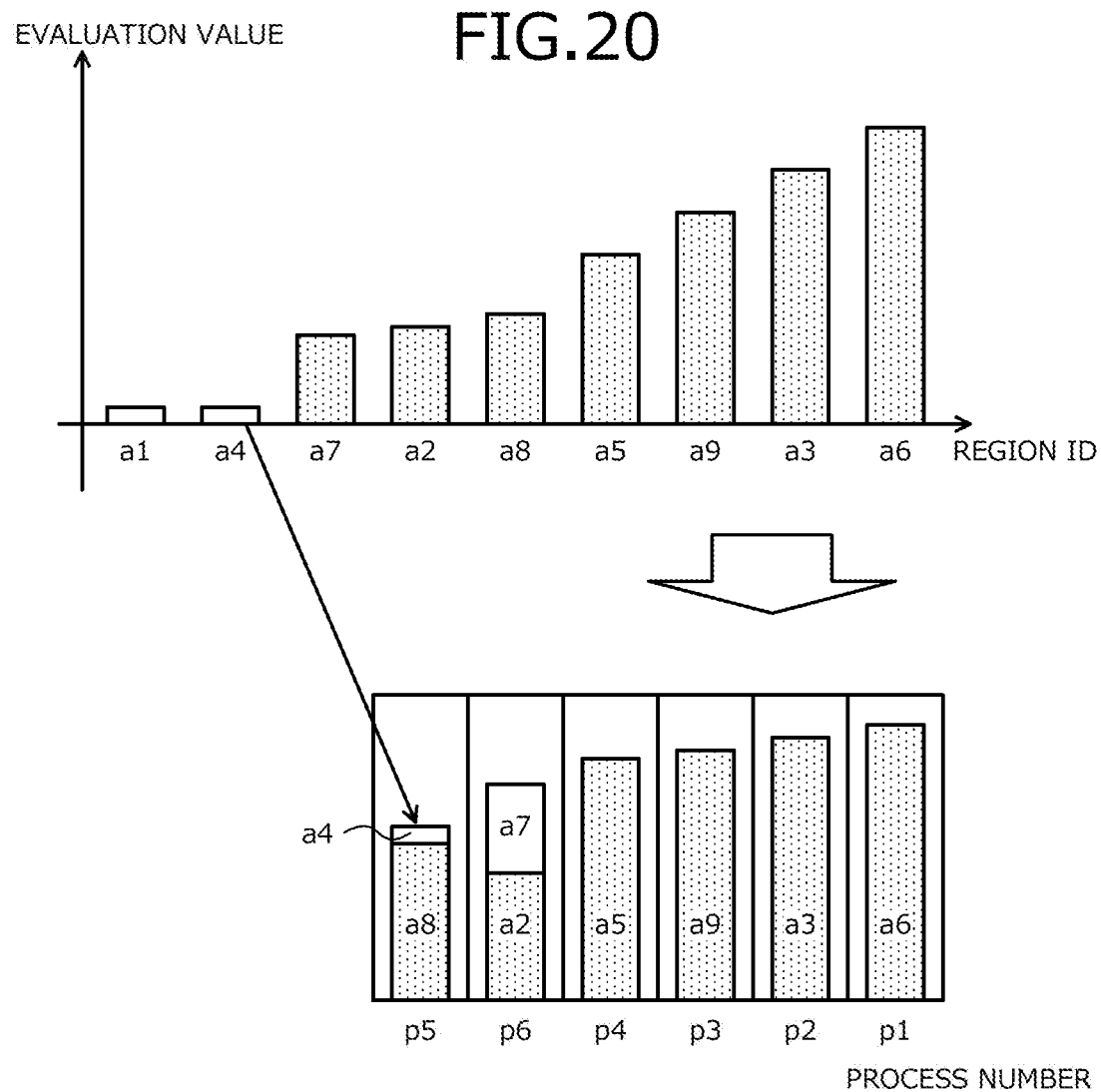
FIG. 20 is an explanatory diagram of the example where the assignment to the process having the smallest evaluation value is executed.

FIG. 20 is an explanatory diagram of the example where the assignment to the process having the smallest evaluation value is executed. For example, the second assigning unit 705 assigns the region a4 having the largest evaluation value of the unassigned regions to the process p5 having the smallest evaluation value for the regions already assigned thereto. For example, the second assigning unit 705 sorts the processes p1 to p6 in ascending order of evaluation values each for the regions already assigned to each thereof.

Figure 21:
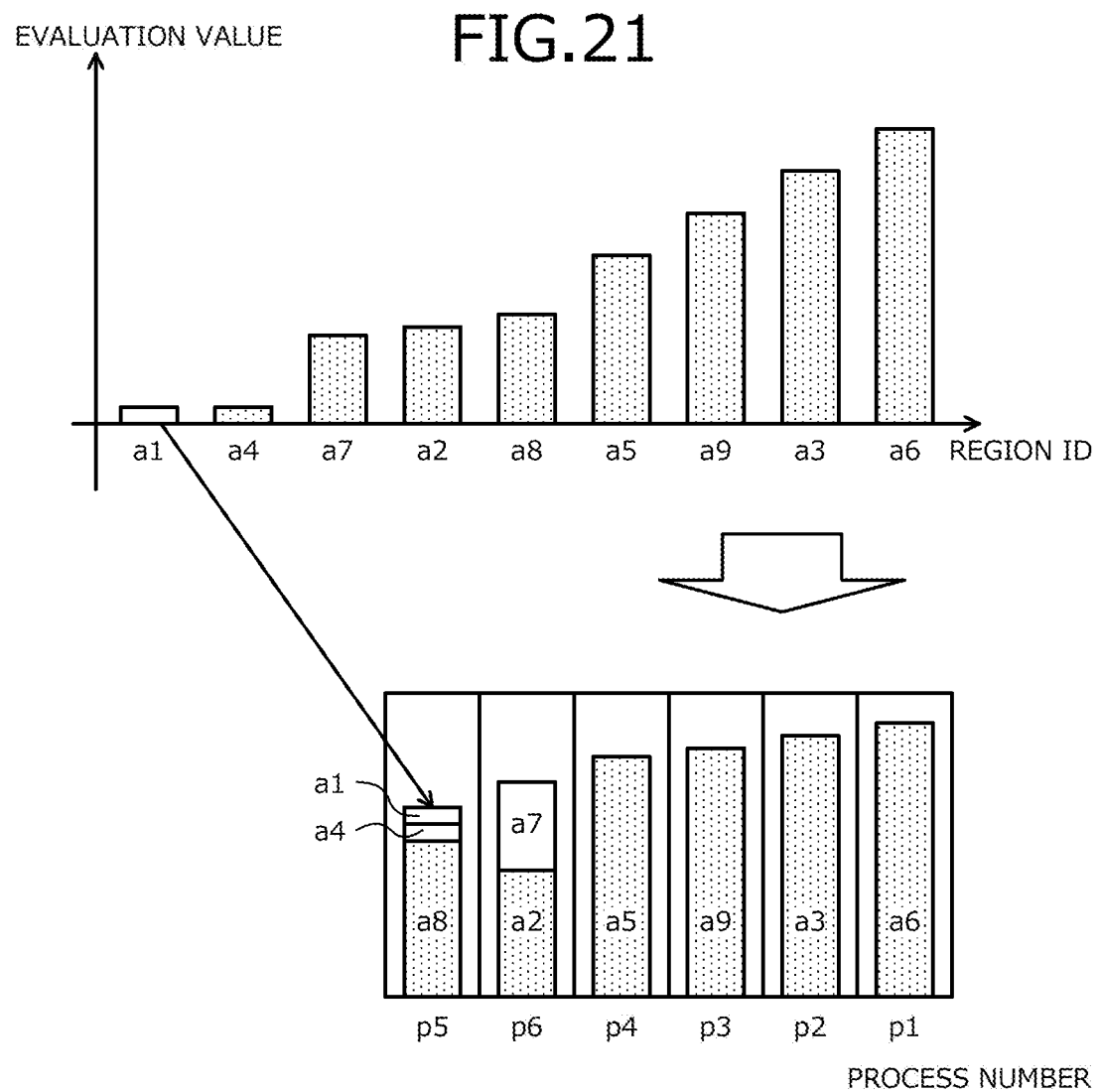
FIG. 21 is an explanatory diagram of the example where the assignment to the process having the smallest evaluation value is executed.

FIG. 21 is an explanatory diagram of the example where the assignment to the process having the smallest evaluation value is executed. For example, the second assigning unit 705 assigns the unassigned region a1 to the process p5 having the smallest evaluation value for the regions already assigned thereto.

The amount of calculation necessary for the assignment in Example 2 is "the predetermined number np+(2×(nd−np)×log(np)×(the average number of the regions retained by one process)) for the second and subsequent assignment sessions". The predetermined number np is the index value of the calculation amount for the first assignment session executed by the first assigning unit 704. "(2×(nd−np)×log(np)×(the average number of the regions retained by one process))" is the index value of the calculation amount for the second and subsequent assignment sessions executed by the second assigning unit 705.

Figure 22:
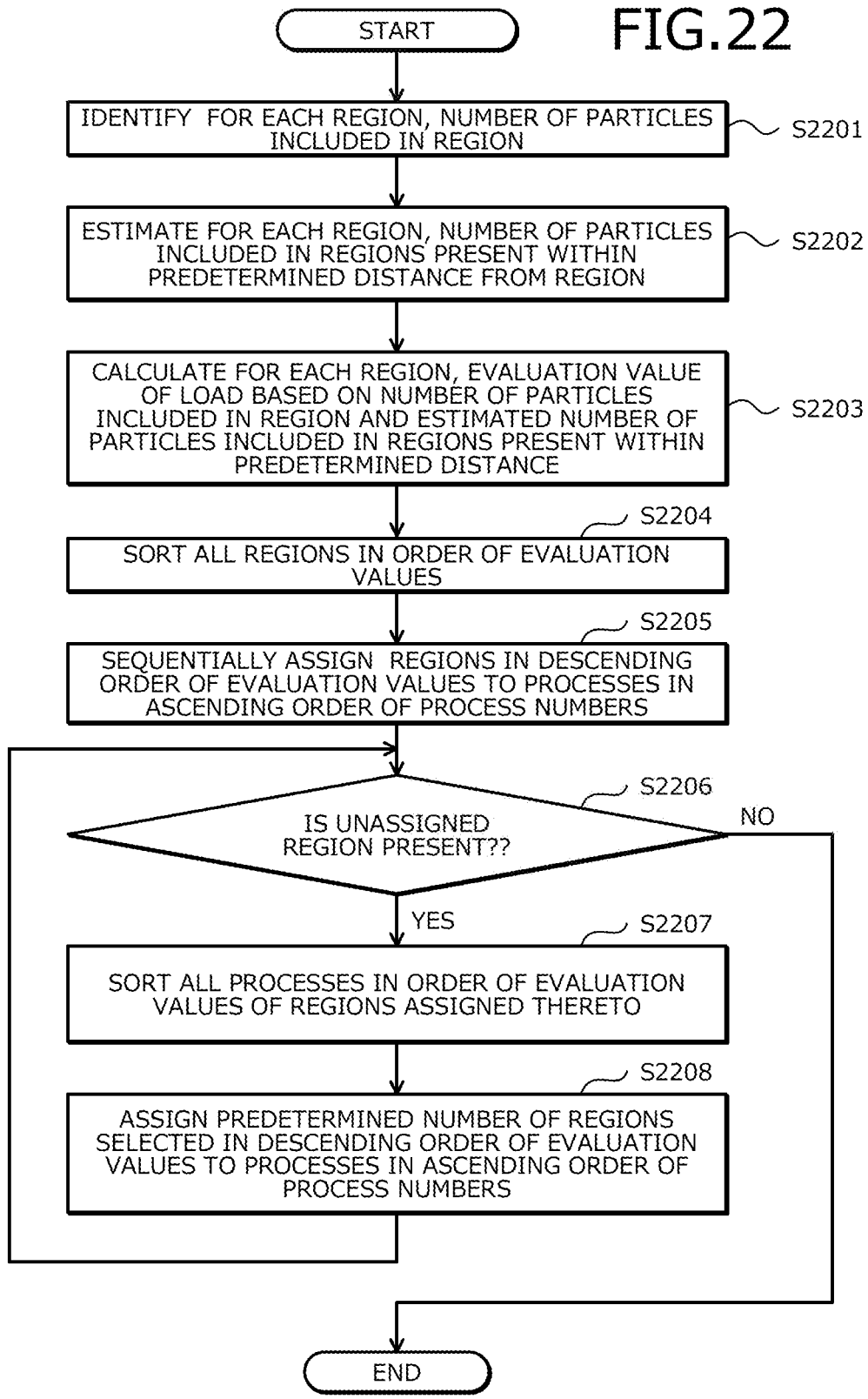
FIG. 22 is a flowchart of an example of a procedure for an assignment process executed by the particle simulation apparatus.

FIG. 22 is a flowchart of an example of the procedure for the assignment process executed by the particle simulation apparatus. The particle simulation apparatus 100 identifies for each region, the number of particles included in the region (step S2201). The particle simulation apparatus 100 estimates for each region, the number of particles included in the regions present within the predetermined distance from the region of the space 101 to be analyzed, based on the ratios of the size of the region and the sizes of the regions present within the predetermined distance, and the number of particles included in the region (step S2202).

The particle simulation apparatus 100 calculates for each region, the evaluation value of the load based on the number of particles included in the region and the estimated number of particles included in the regions present within the predetermined distance (step S2203). The particle simulation apparatus 100 sorts all the regions in order of the evaluation values (step S2204). The particle simulation apparatus 100 sequentially assigns to the processes in ascending order of process numbers, the regions in descending order of evaluation values (step S2205).

The particle simulation apparatus 100 determines whether an unassigned region is present (step S2206). When the particle simulation apparatus 100 determines that an unassigned region is present (step S2206: YES), the particle simulation apparatus 100 sorts all the processes in order of evaluation values of the regions assigned thereto (step S2207). The particle simulation apparatus 100 assigns to the processes in ascending order of process numbers, the predetermined number np of regions selected in descending order of evaluation values (step S2208) and returns to step S2206.

When the particle simulation apparatus 100 determines that no unassigned region is present at step S2206 (step S2206: NO), the particle simulation apparatus 100 causes the series of process steps to come to an end.

FIG. 23 is an explanatory diagram of the relationship between the processes and the calculation nodes. For example, the calculation nodes n1 to n5 are processors included in one computer. For example, the regions are assigned to the processes p1 to p5 such that the number of particles is equalized. For example, the regions a1 and a5 are assigned to the process p1. In the present embodiment, as described above, the calculation nodes and the processes are correlated. For example, the calculation nodes n1 to n5 respectively execute the processes p1 to p5.

For example, to execute the process p1, the calculation node n1 simulates the behavior of the particles included in the regions a1 and a5 assigned to the process p1.

As described above, the particle simulation apparatus 100 assigns the plural regions in descending order of the number of particles to the processes that differ from each other and are fewer in number than the number of the regions and thereafter, sequentially assigns the unassigned regions in the above order to the processes identified based on the number of particles of the regions already assigned thereto. In this manner, the regions whose loads are estimated to be large are first assigned to the processes and the remaining unassigned regions whose loads are small are assigned such that the loads are equalized among the processes. Thus, realization of efficient parallel processing may be facilitated.

The particle simulation apparatus 100 sequentially assigns the unassigned regions in descending order of the number of particles to the process for which the total number of particles included in the regions already assigned thereto and particles included in the unassigned region does not exceed the average particle number. In this manner, equalization of the number of particles included in the regions assigned to the processes can be facilitated such that the number of particles included in the regions assigned to each of the processes does not exceed the average particle number. Thus, realization of efficient parallel processing can be facilitated.

The particle simulation apparatus 100 sequentially assigns the regions in descending order of the number of particles to the process having the smallest number of particles included in the regions already assigned thereto among the predetermined number of processes. In this manner, the assignment to the process having the smallest number of particles included in the regions already assigned thereto is executed and therefore, equalization may be facilitated for the number of particles included in the regions assigned to the processes. Thus, realization of efficient parallel processing may be facilitated.

The particle simulation apparatus 100 estimates for each of the plural regions, the number of particles included in the skirt regions thereof and calculates an evaluation value that indicates the calculation load and the communication load for the region based on the estimated number of particles included in the skirt regions thereof and the number of particles included in the region. For example, the particle simulation apparatus 100 estimates for each of the plural regions, the number of particles included in the skirt regions thereof based on the ratios of the size of the region and the sizes of the skirt regions thereof, and the number of particles included in the region. In this manner, the regions can be assigned based on the evaluation value taking the communication load into consideration and therefore, equalization may be facilitated for the calculation loads for the behavior of the particles of each of the processes. Thus, realization of efficient parallel processing may be facilitated.

Each of the plural regions is a cuboid. When the shape of the region is simple like a cuboid, simplification of the routines may be facilitated for the data communication among the regions. For example, when the region is a cuboid, identification of the regions adjacent to one region is simple, and reduction of the time period necessary for the parallel processing may be facilitated.

It is assumed in the present embodiment that the processing capacity of each of the plural calculation nodes to execute the plural processes is equal to that of each other. The "calculation node" may, for example, be each core included in a multi-core processor or be a processor. Even in a case where the processing capacity of each of the calculation nodes differs from each other, the number of processes to be assigned merely has to be determined based on the capacity of the calculation node when the calculation load assigned to each of the plural processes is equal to each other. Thus, simplification may be facilitated for the assignment of the processes to the calculation nodes.

The computing machine resource allocation method used in the particle simulation described in the present embodiment may be realized by executing a particle simulation program prepared in advance, on a computer such as a personal computer or a work station. The particle simulation program is recorded on a computer-readable recording medium such as a magnetic disk, an optical disk, a universal serial bus (USB) flash memory. The particle simulation program is executed by being read from the recording medium by the computer. The particle simulation program may be distributed through a network such as the Internet. Although the regions to be assigned are processed in descending order of number of particles in the present embodiment, the order is not limited hereto and the regions may be processed in ascending order of number of particles.

As described above, with the conventional techniques, however, when the calculation loads for the behavior of the particles for the regions are not equal to each other, the calculation loads for the behavior of the particles for the processes are not equal to each other and the load, therefore, may concentrate at any one of the processes. A problem, therefore, arises in that parallel processing cannot be executed efficiently. For example, with the traditional techniques, when the number of particles included in each of the regions is not equal to each other, the calculation load for the behavior of the particles is not equal to each other.

According to one aspect of the present invention, parallel processing may be executed efficiently.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory, computer-readable recording medium storing therein a number of particles equalization simulation program for simulating, by np processes, behavior of particles included in nd regions of a space subject to analysis, where np is smaller than nd, the particle simulation program causing a computer to execute a process comprising:

estimating, for each of the nd regions and based on a number of particles included in the region, a number of particles included in a skirt region surrounding the region;

calculating an evaluation value for each of the nd regions, based on the number of particles included in the region and the estimated number of particles included in the skirt region;

selecting np regions (hereinafter, "first regions") from among the nd regions in descending order of the evaluation value;

assigning the first regions to the np processes, respectively;

identifying one of the np processes for which the evaluation value of the first region assigned thereto is largest among the np processes;

assigning unassigned nd minus np regions (hereinafter, "second regions") of the nd regions to the identified process in descending order of the evaluation value; and reducing a processing time of the identified process by equalizing the number of particles assigned to each of the np processes;

the estimating includes estimating the number of particles included in the skirt region by $(2(Lx+Ly+2h) \times h/(Lx \times Ly)) \times nx$, where Lx represents a length of the region in x direction, Ly represents a length of the region in y direction, h represents influential radius, and nx represents the number of particles included in the region.

2. The non-transitory, computer-readable recording medium according to claim 1, the process further comprising calculating an average particle number by dividing a total number of particles in the space subject to analysis by np, wherein the assigning includes assigning the second regions such that a total of evaluation values of the first and second regions assigned to the identified process does not exceed the average particle number.

3. The non-transitory, computer-readable recording medium according to claim 1, wherein the identifying includes identifying one of the np processes for which a total of evaluation values of the first regions and the second regions assigned thereto is smallest.

4. The non-transitory, computer-readable recording medium according to claim 1, wherein the evaluation value indicates a calculation load for simulating behavior of the particles included in the region and a communication load between the particles and other particles included in the skirt region.

5. The non-transitory, computer-readable recording medium according to claim 1, wherein each of the nd regions is a cuboid.

6. The non-transitory, computer-readable recording medium according to claim 1, wherein the calculating includes calculating the evaluation value by $nx+a\times 2(Lx+Ly+2h)\times h/(Lx\times Ly)\times nx$, where a is a real number that represents a ratio of communication cost and calculation cost per one particle.

7. A computing machine resource allocation method in a number of particles equalization simulation for simulating, by np processes, behavior of particles included in nd regions of a space subject to analysis, where np is smaller than nd, the method comprising:
   estimating, for each of the nd regions and based on a number of particles included in the region, a number of particles included in a skirt region surrounding the region;
   calculating an evaluation value for each of the nd regions, based on the number of particles included in the region and the estimated number of particles included in the skirt region;
   selecting np regions (hereinafter, "first regions") from among the nd regions in descending order of the evaluation value;
   assigning the first regions to the np processes, respectively;
   identifying one of the np processes for which the evaluation value of the first region assigned thereto is largest among the np processes;
   assigning unassigned nd minus np regions of the nd regions to the identified process in descending order of the evaluation value; and
   reducing a processing time of the identified process by equalizing the number of particles assigned to each of the np processes;
   the estimating includes estimating the number of particles included in the skirt region by $(2(Lx+Ly+2h)\times h/(Lx\times Ly))\times nx$, where Lx represents a length of the region in x direction, Ly represents a length of the region in y direction, h represents influential radius, and nx represents the number of particles included in the region.

8. A number of particles equalization simulation apparatus comprising:
   a control circuit for simulating, by np processes, behavior of particles included in nd regions of a space subject to analysis, where np is smaller than nd, the control circuit configured to:
   estimate, for each of the nd regions and based on a number of particles included in the region, a number of particles included in a skirt region surrounding the region;
   calculate an evaluation value for each of the nd regions, based on the number of particles included in the region and the estimated number of particles included in the skirt region;
   select np regions (hereinafter, "first regions") from among the nd regions in descending order of the evaluation value;
   assign the first regions to the np processes, respectively;
   identify one of the np processes for which the evaluation value of the first region assigned thereto is largest among the np processes;
   assign unassigned nd minus np regions of the nd regions to the identified process in descending order of the evaluation value; and
   reduce a processing time of the identified process by equalizing the number of particles assigned to each of the np processes;
   the estimating includes estimating the number of particles included in the skirt region by $(2(Lx+Ly+2h)\times h/(Lx\times Ly))\times nx$, where Lx represents a length of the region in x direction, Ly represents a length of the region in y direction, h represents influential radius, and nx represents the number of particles included in the region.

* * * * *